United States Patent [19]
Johnson et al.

[11] 4,453,188
[45] Jun. 5, 1984

[54] DISK DRIVE

[75] Inventors: Richard E. Johnson, Los Altos; Roger O. Williams, Campbell; Ronald W. Higgins, San Jose; David M. Lewis, Santa Cruz, all of Calif.

[73] Assignee: Amlyn Corporation, San Jose, Calif.

[21] Appl. No.: 253,015

[22] Filed: Apr. 10, 1981

[51] Int. Cl.$^3$ .............................................. G11B 21/08
[52] U.S. Cl. ........................................ 360/78; 360/86; 360/98; 360/133
[58] Field of Search ................................ 360/77–79, 360/97–99, 86, 133, 135; 274/10

[56] References Cited

U.S. PATENT DOCUMENTS

| | | | |
|---|---|---|---|
| 4,122,503 | 10/1978 | Allan | 360/78 |
| 4,170,031 | 10/1979 | Beuch et al. | 360/98 |
| 4,195,321 | 3/1980 | Chelin et al. | 360/98 |
| 4,301,486 | 11/1981 | Brown et al. | 360/99 |

FOREIGN PATENT DOCUMENTS

2331114  3/1977  France.
1499320  2/1978  United Kingdom.

OTHER PUBLICATIONS

Nathanson, et al. Advanced 6 Megabyte Flexible Disk Drive pp. 1–3.

*Primary Examiner*—Aristotelis M. Psitos
*Assistant Examiner*—Kin Wong
*Attorney, Agent, or Firm*—Fliesler, Dubb, Meyer & Lovejoy

[57] ABSTRACT

A floppy disk drive including a pivotally mounted disk pack storing a plurality of floppy diskettes, a driver mechanism for rotating any one of the diskettes into a retrievable position, a picker mechanism for moving the one diskette between the retrievable position and an operative position at which the diskette is rotatable on a spindle, and a position control circuit for controlling the position of a recording head across the one diskette being in the operative position and for compensating for expansion, contraction, and eccentric rotation of the one diskette. The floppy diskettes are stored bent in the disk pack, but in the operative position the one diskette that had been retrieved from the retrievable position is stored only partially in the disk pack and parallel to the plane of rotation. A microprocessor controls the entire disk drive.

25 Claims, 19 Drawing Figures

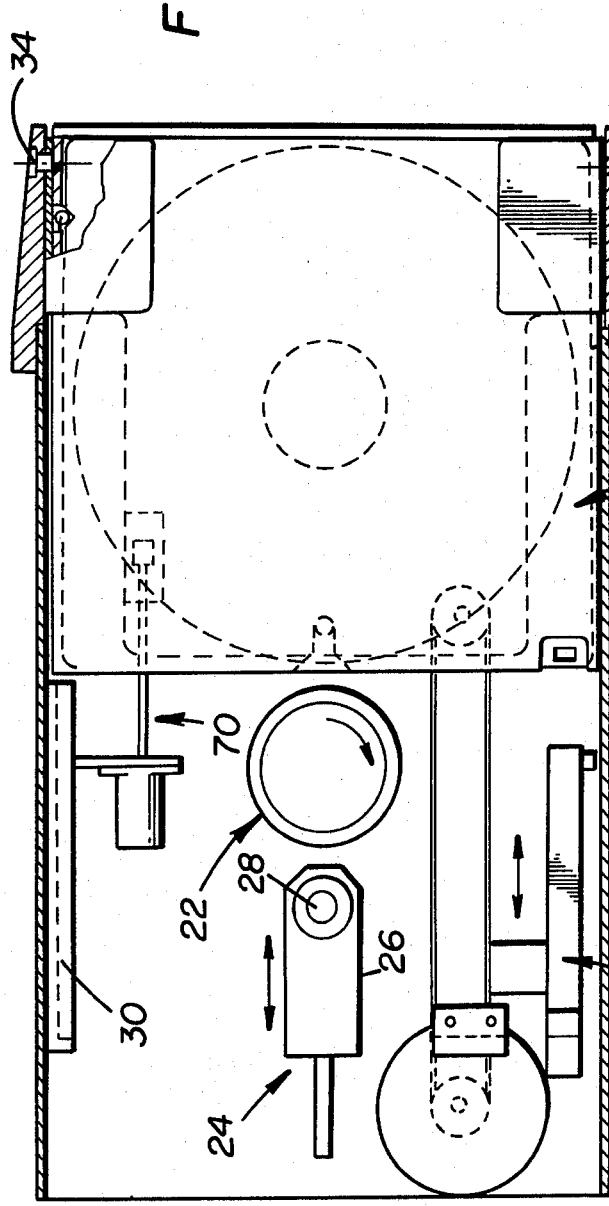
FIGURE 2
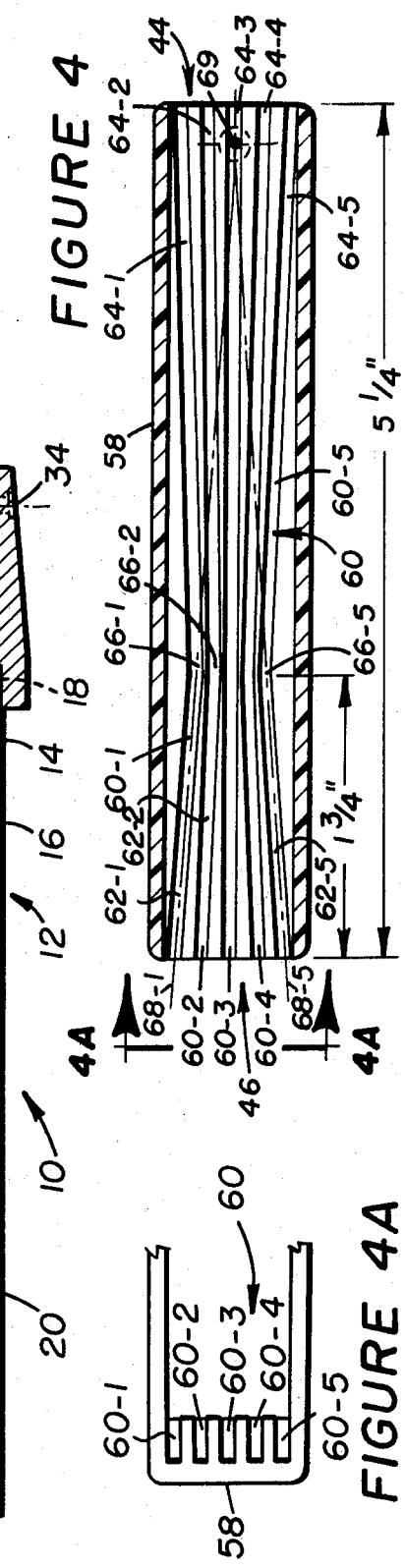
FIGURE 4
FIGURE 4A

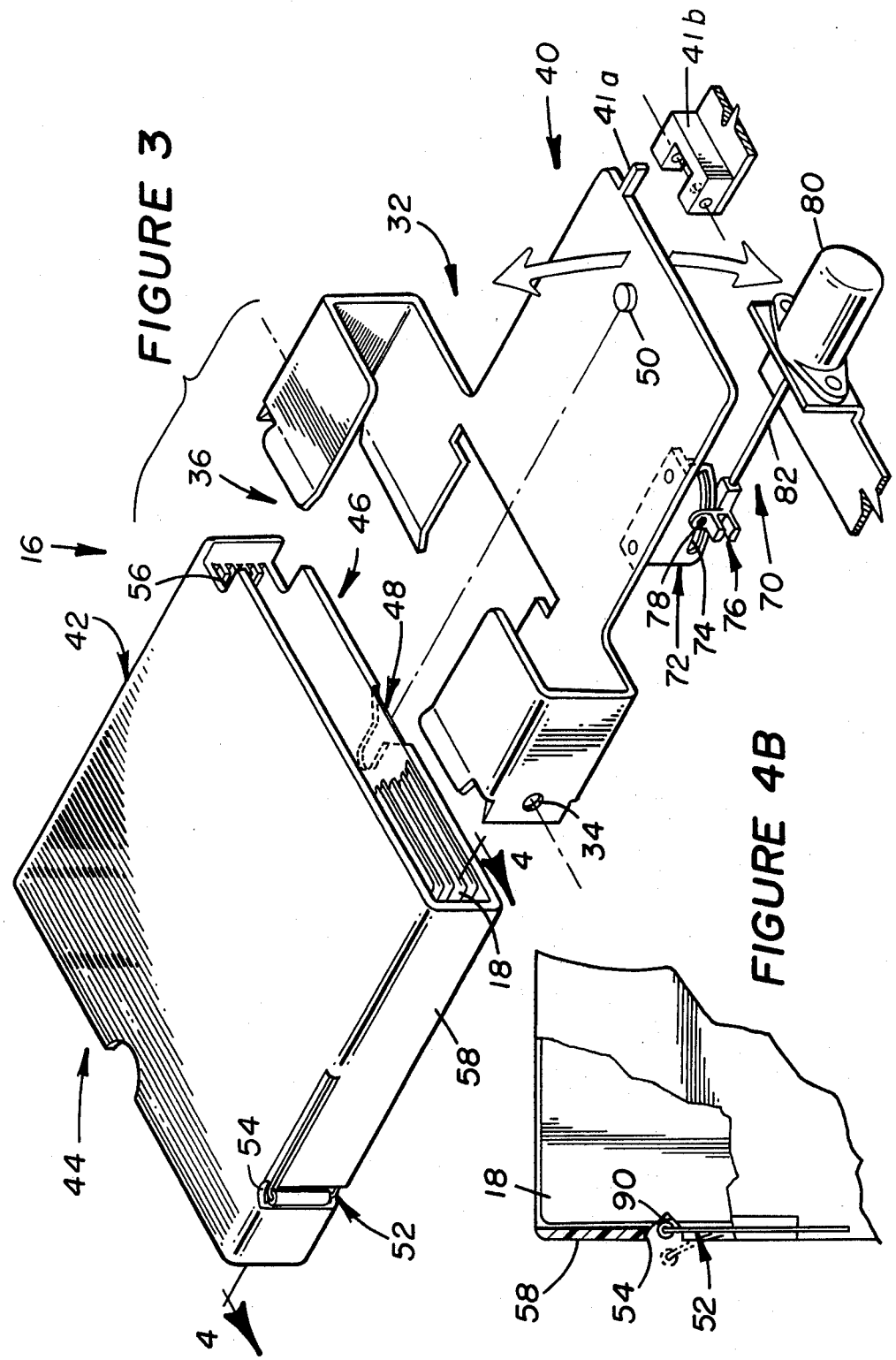

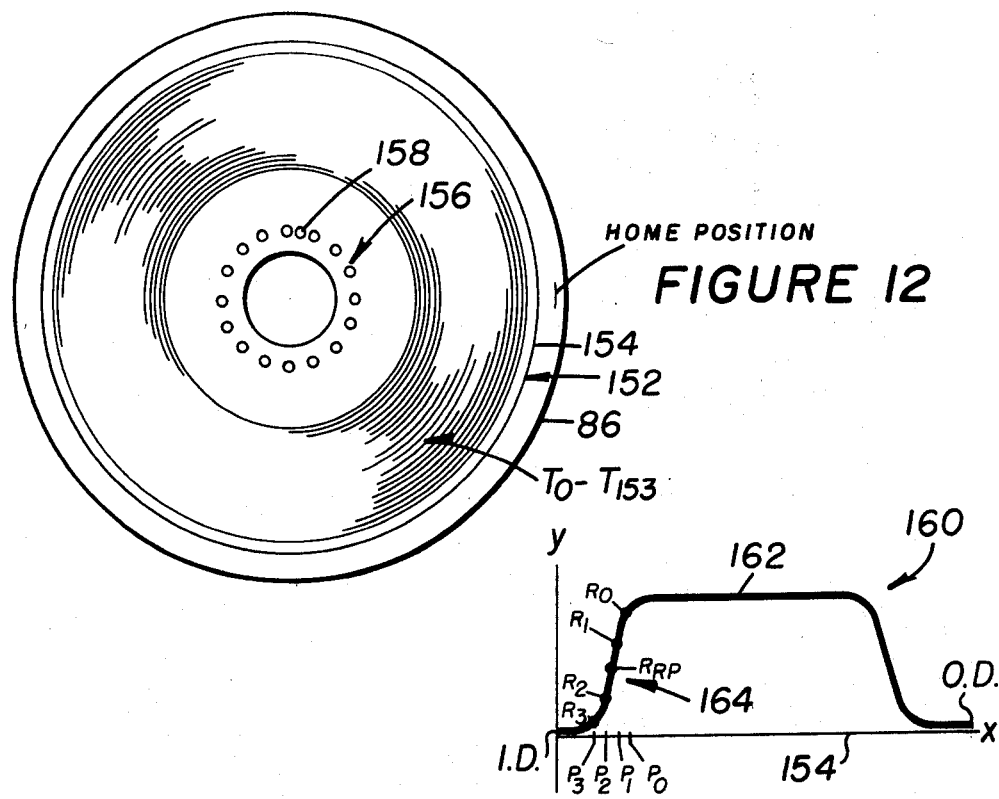
FIGURE 12
FIGURE 13
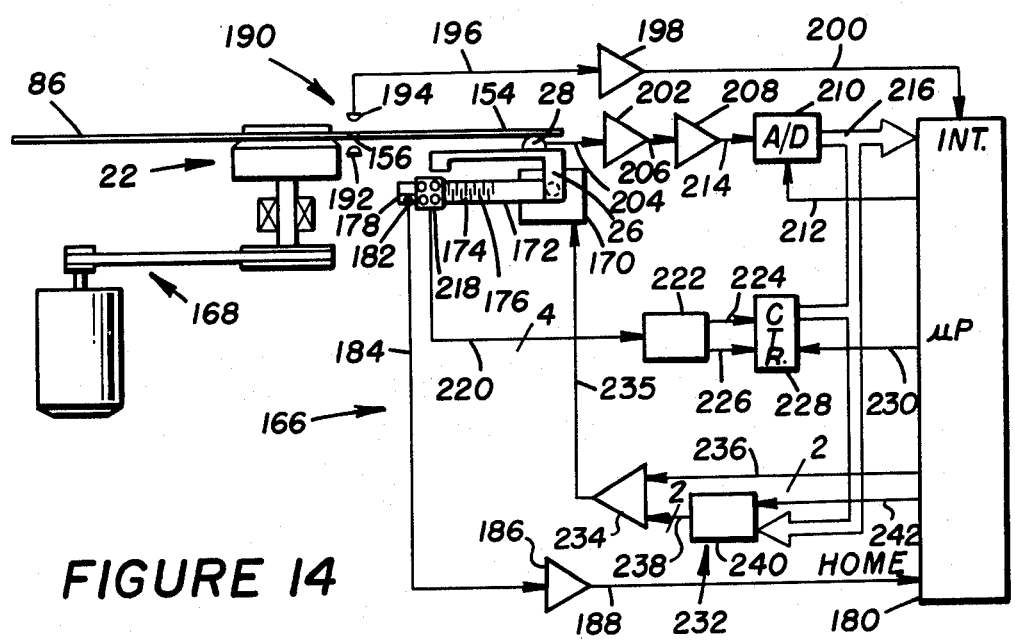
FIGURE 14

(OPEN POSITION)

(CLOSED POSITION)

DISK DRIVE

TECHNICAL FIELD

This invention relates to information storage systems and, more particularly, to disk storage apparatus and drive control apparatus for disk drives.

BACKGROUND OF THE INVENTION

Information storage systems are employed to store data which are processed by data processors such as micro-computers, mini-computers and main frames. A disk drive is one type of information storage system whose use is rapidly expanding, in part because it provides high-capacity, on-line, random access storage for small to medium scale computer systems. The data storage medium of the disk drive can be a hard, i.e., inflexible, disk or a soft, i.e., flexible, disk or diskette, known as a floppy disk. The disk drive has a read/write recording head that is movable radially across concentric data tracks on the diskette while the diskette is rotated on a spindle. Disk drives are identified by their sizes and given generic names such as mini-drives and maxi-drives.

As can be appreciated, a wide variety of technical problems must be satisfactorily solved before a disk drive can be adequately utilized. One problem is to provide a disk drive of a given size with a higher, on-line, data storage capacity. One type of disk drive solves this problem by providing a disk pack which stores a plurality of diskettes. A drive mechanism linearly moves the disk pack up and down to bring any one of the diskettes into a retrievable position. The one diskette then is retrieved or picked from the disk pack and moved inwardly to an operative or rotational position on the spindle. After use, the diskette is returned to the disk pack and the procedure can then be repeated to retrieve another diskette.

While the storage of a plurality of diskettes in the disk pack increases the data storage capacity of the disk drive, the linear up and down motion of the pack adds to the space requirements of the disk drive. Furthermore, a relatively complicated drive mechanism is utilized to move the disk pack up and down. Also, this space requirement and complicated drive mechanism increase the cost of the disk drive.

Another problem relates to the design of a picker mechanism for retrieving the diskette from, and returning it to, the disk pack. A prior picker mechanism has spring-biased jaws which are driven onto an edge of the diskette to open slightly and clamp the diskette. Then, the jaws hold the diskette by friction while the diskette is moved to the operative position. Thereafter, the jaws slide off the diskette to unclamp or release the diskette in the operative position. One disadvantage is that the jaws are clamped on the jacket of the diskette, which can cause wear of the jacket and damage to the data storage medium in the jacket. Also, relatively high electrical power and a large motor are required to drive the jaws onto the diskette edge. Furthermore, the power needed to drive the jaws onto the edge must be balanced against the power used in moving the jaws towards the operative position to prevent the jaws from slipping off the edge.

Yet another problem is the expansion or contraction exhibited by the data storage medium in response to temperature and humidity conditions. This expansion or contraction increases or decreases the distance between centerlines of the concentric data tracks, causing problems in accurately positioning or servoing the recording head over a data track. One prior disk drive uses an outer and an inner servo track being outside and inside the data tracks, respectively. The expansion and contraction of the data storage medium are compensated by measuring the variable distance between the inner and outer servo tracks, and then assigning proportional locations for all the data tracks which lie between the servo tracks. As the recording head is moved to a particular data track, a scale is sensed to detect the distance moved by the head. When the distance moved by the head indicates that the assigned position has been reached, the head is assumed to be centered over the particular data track and movement of the head is stopped.

One disadvantage with the above compensation scheme is that two servo tracks must be written on the storage medium by the diskette manufacturer. The use of two servo tracks also reduces the available data storage capacity of the diskette. Another disadvantage is that the recording head must be moved across the diskette between the inner and outer servo tracks to detect their relative positions and calculate the distance between them, thereby requiring a relatively long time for collecting the data to make the compensation. Still another disadvantage is the use of a complicated algorithm for computing the data assigning positions to the data tracks.

SUMMARY OF THE INVENTION

It is an object of the present invention to provide a novel information storage system.

It is another object of the present invention to provide a disk drive of given size and space requirement with high storage capacity.

Yet another object of the present invention is to provide a picker mechanism having mechanically actuated jaws.

Still another object of the present invention is to provide an improved technique for compensating for expansion or contraction of a data storage medium.

The above and a number of other objects of the present invention are obtained through the use of an information storage system, such as a disk drive, that has a pivotal means for storing a plurality of data storage devices, such as diskettes, means, including a mechanically actuated picker mechanism, for picking and moving one of the data storage devices from a retrievable position of the pivotal storing means to an operative position at which the one data storage device is used, and a position control circuit for positioning a recording head relative to the one data storage device at the operative position. The position control circuit compensates, for example, for expansion or contraction of the data storage medium by having a scale which expands and contracts proportionally with the data storage medium to provide information for locating the expanded or contracted data tracks on the data storage device.

BRIEF DESCRIPTION OF THE DRAWINGS

FIG. 2 is a top view of the disk drive of FIG. 1.

FIG. 3 is an exploded view, in perspective, of a pivotal storage box and a drive for pivoting the box.

FIG. 4 is a section taken along lines 4—4 of a disk pack of the pivotal storage box of FIG. 3.

FIG. 4A is a section taken along lines 4A—4A of FIG. 4.

FIG. 4B is a top view, partially broken away, of the disk pack shown in FIG. 3.

FIG. 12 is a top view of a data storage medium of a diskette used with the disk drive of FIG. 1.

FIG. 13 shows a signal waveform used to explain a recording head position control circuit utilized by the disk drive.

FIG. 14 is a block diagram of the position control circuit.

DETAILED DESCRIPTION OF THE INVENTION

Figure 1:
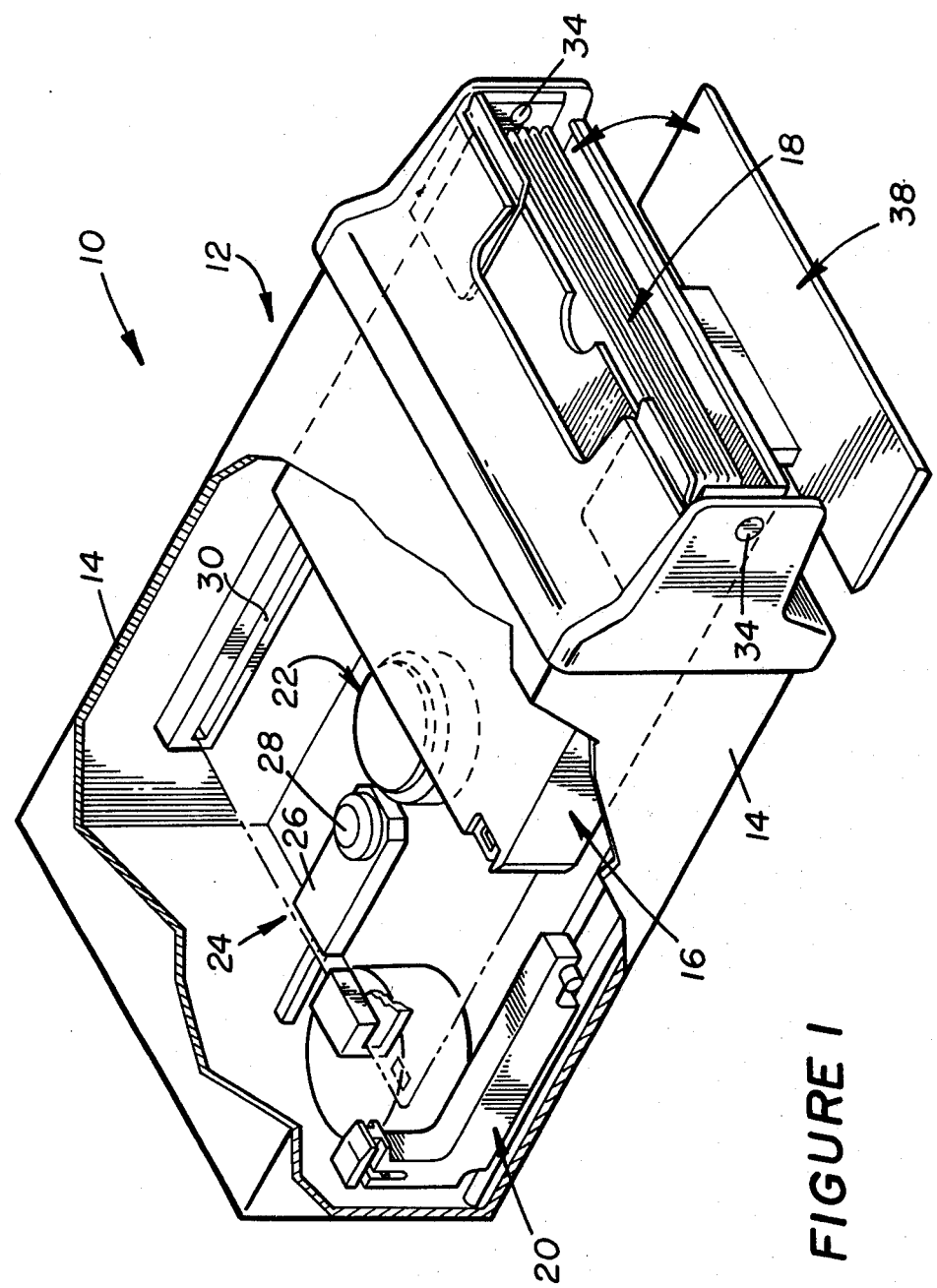
FIG. 1 is a simplified, partially broken view, in perspective, of a disk drive.

FIG. 1 and FIG. 2 illustrate an information storage system 10. The system 10 is, for example, a disk drive 12 and, in particular, a floppy disk drive. While the present invention will be described in connection with the floppy disk drive 12, it will become apparent that a number of the components to be described can be utilized for other information storage systems in general and other types of disk drives in particular.

Disk drive 12 has an envelope or base 14 which mounts pivotally a box 16 that stores or houses a plurality of data storage devices 18 such as floppy disks or diskettes. A picker mechanism 20 is supported on base 14 to pick or clamp, and move, any one of the floppy diskettes 18 stored in box 16 between a retrievable position into which the one diskette 18 is pivotable and an operative position at which the one diskette 18 is rotatable on a spindle 22.

A position control device 24, connected to the base 14, includes a carriage 26 which carries and moves a recording head 28 radially inwardly and outwardly across the diskette 18 being rotated on the spindle 22. Position control device 24, as will be further described, accurately positions the head 28 with respect to concentric data tracks on a data storage medium (described below) of the diskette 18 after compensating for expansion or contraction of the data storage medium due to, for example, temperature and humidity conditions, or after compensating for eccentric rotation of the data storage medium due to slight misalignment on the spindle 22.

Base 14 also has a straight edge guide 30 which supports and guides a diskette 18 during its movement between the retrievable position and the operative position.

As shown in FIG. 3, the pivotable box 16 includes a support tray 32 which is pivotally mounted on base 14 by a pair of pivots at 34 (see also FIG. 1). Tray 32 has an open rear end 36 that can be closed by a pivotally mounted door 38, connected to base 14 (see FIG. 1), and an open front end 40 which faces the spindle 22.

Tray 32 also has a flag 41a that is movable into a fixed optical sensor 41b to signal that box 16 is in a home position, as will be further described.

Box 16 also includes a disk pack 42 which is insertable into the tray 32 through the rear end 36 and rotates with tray 32 about pivots 34. Disk pack 42 also has an open rear end 44 which can be closed by door 38 and an open front end 46 facing spindle 22. Disk pack 42 has a guide 48 and tray 32 has a pin 50 which locates or centers the disk pack 42 via guide 48 upon insertion of the pack 42 into the tray 32. Disk pack 42 also has a spring-biased detent 52 that is biased into a pack groove 54, as well as a cut-out 56, for purposes to be described.

Disk pack 42 removably stores or houses a plurality of the diskettes 18. As illustrated in FIG. 4, FIG. 4A and FIG. 4B, a side 58 of disk pack 42 has a plurality of guides or rails shown generally at 60 for supporting the plurality of diskettes 18, respectively. As one example, there are five guides 60-1, 60-2, 60-3, 60-4, 60-5, in which four are angled, e.g. V-shaped, and one, i.e., guide 60-3, is straight. The diskettes 18, which are floppy diskettes and, therefore, flexible, are bent or follow the angle of guides 60 when supported on these four guides. The diskette 18 supported on guide 60-3 is straight since this guide is straight.

Each of the guides 60-1, 60-2, 60-4 and 60-5 has a forward, substantially straight guide portion 62-1, 62-2, 62-4 and 62-5 joining a rearward, substantially straight guide portion 64-1, 64-2, 64-4 and 64-5 via an apex 66-1, 66-2, 66-4 and 66-5. The guide portions 62-1, 62-2, 62-4 and 62-5 are angled such that their centerlines 68-1, 68-2, 68-4, 68-5 extend through a pivot point 69 on side 58 coincident with the pivots 34. Guide 60-3, which is not angled, also has a centerline 68-3 extending through point 69. Furthermore, the apices 66-1, 66-2, 66-4 and 66-5 are approximately one-third in from the front end 46.

This angling of the guide portions 62-1, 62-2, 62-4 and 62-5 and location of the apices 66-1, 66-2, 66-4 and 66-5 provide a number of advantages. The diskettes 18, when supported on the plurality of guides 60, are "fanned" at the rear end 44 and front end 46. This provides sufficient space between the diskettes 18 to remove a particular diskette by hand from the rear end 44 of disk pack 42 and, more importantly, to retrieve a particular diskette from the front end 46 of disk pack 42 by picker mechanism 20. Also, there is sufficient spacing between the plurality of guides 60 in the area of the apices 66-1, etc., to provide, for example, as many as five such guides 60 within the given height of disk pack 42. Moreover, for reasons which will become apparent, the distance between a given apex 66-1, etc., and the axis of rotation of spindle 22 is equal to the radius of the diskettes 18. The diskettes 18 can be, for example, minifloppy diskettes having a diameter of $5\frac{1}{4}''$. Still furthermore, and also as will become apparent, the disk pack 42 need only be rotated a limited amount around pivots 34 and point 69 to move any one of the diskettes 18 into the retrievable position for picking by picker mechanism 20.

With reference again to FIG. 3, base 14 supports a drive mechanism 70 for rotating box 16 about pivots 34. Mechanism 70 includes an index cam 72, having a cam surface 74, which is connected to the bottom of tray 32, and a clevis 76 having a cam follower 78 which moves along surface 74. A stepper motor 80 and lead screw 82 are connected to clevis 76 to drive cam follower 78 along cam surface 74, thereby pivoting tray 32 and, hence, disk pack 42.

Stepper motor 80, as will be further described, is selectively controlled to drive or move cam follower 78 to any one of five discrete positions along cam surface 74. This action brings any one of the diskettes 18 stored in disk pack 42 into the retrievable position for retrieving by picker mechanism 20, as will now be described.

Figure 5:
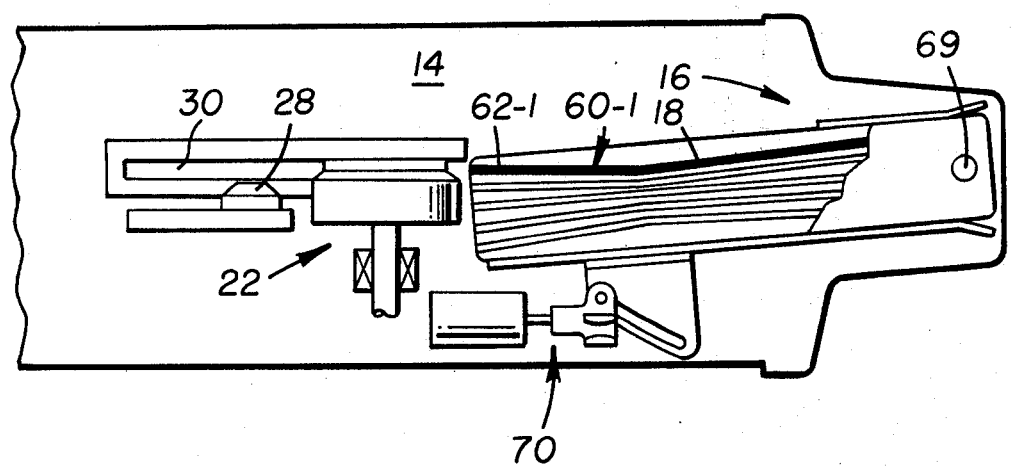
FIG. 5, FIG. 6 and FIG. 7 are illustrations used to explain the operation of the pivotal storage box.
Figure 6:
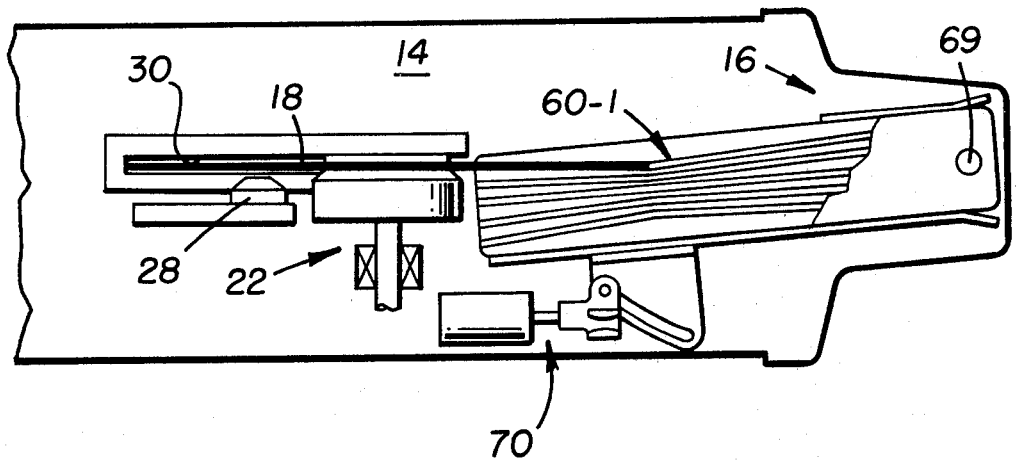

FIG. 5 illustrates the bent guide 60-1 of box 16 as being rotated downwardly to a position called the retrievable position. In this retrievable position, the diskette 18 in guide 60-1 is in a position ready to be retrieved by picker mechanism 20 (not shown). Then, as shown in FIG. 6, the picker mechanism 20 has retrieved the diskette 18 from guide 60-1 and moved it to the operative position at which the diskette 18 is clamped on spindle 22 and ready to be rotated. In moving from the retrievable position to the operative position, the diskette 18 is guided by guide 60-1 and by edge guide 30 on base 14. In the operative position, a portion of the diskette 18 is still supported in guide portion 62-1. Moreover, the guide portion 62-1 is aligned with edge guide 30 and the guide portion 62-1 is parallel to the plane of rotation of diskette 18. Thus, while the diskette 18 is bent or angled when in the retrievable position, it is flat when in the operative position.

It now may be appreciated that box 16 can be pivoted to any one of the five discrete positions to move any one of the five diskettes 18 into the retrievable position shown in FIG. 5. The angles of guide portions 62-1 through 62-5 are such that when any one of them is in the retrievable position and the corresponding diskette 18 is moved into the operative position, the diskette will be flat having the parallel plane of rotation.

Figure 7:
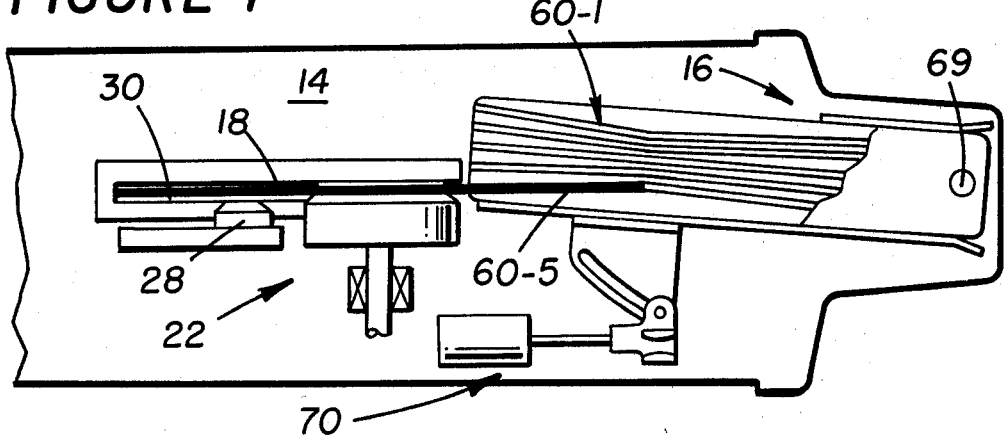

After using the diskette 18 in the operative position, the picker mechanism 20 returns this diskette 18 to the retrievable position. Then, box 16 can be pivoted to any one of the other rotatable positions to place another diskette in the retrievable position, which is then brought into the operative position. FIG. 7 shows another diskette 18 being in such an operative position. This pivoting of box 16 is random in the sense that box 16 can be pivoted from any one rotatable position to any other rotatable position to move a selected diskette 18 into the retrievable position without having to first retrieve any of the diskettes 18 in any intermediate guides 60. As will be further described, this selection process is performed under program control of a data processor, such as a microprocessor, which controls energization of stepper motor 80.

Figure 8:
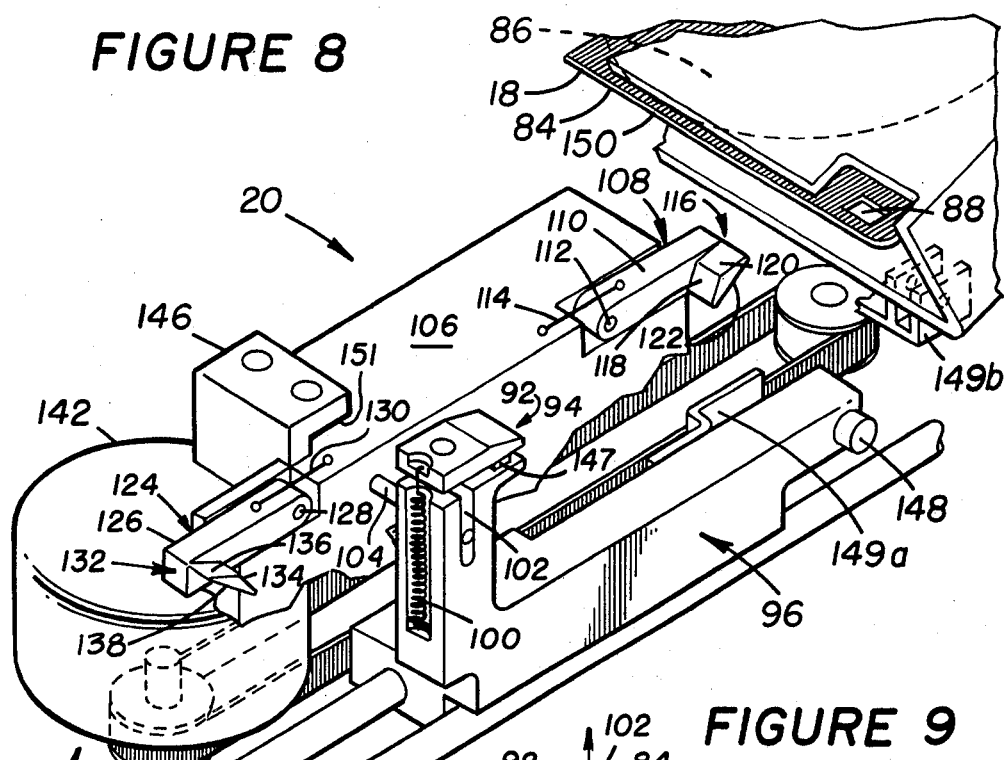
FIG. 8 illustrates, in perspective, a picker mechanism for the disk drive of FIG. 1.

FIG. 8 illustrates the picker mechanism 20 in relation to a diskette 18 that is assumed to be in the retrievable position. The diskette 18 has a jacket 84 surrounding a disk-shaped data storage medium 86. The jacket 84 of each diskette 18 has a slot 88 that is aligned with cut-out 56 of disk pack 42 and has an edge groove 90 (see FIG. 4B) that is aligned with spring biased detent 52 and groove 54 of disk pack 42 when the diskette 18 is stored in the pack 42.

Picker mechanism 20 includes a pick head 92 that has a pair of openable and closeable jaws 94 which pick or clamp the diskette 18 via slot 88. Pick head 92 is supported on a carriage 96 which rides on a pair of guide rods 98. A spring 100 is disposed between the upper of the jaws 94 and the carriage 96 to bias the jaws 94 closed. The upper of the jaws 94 moves vertically on a shaft 102 that has a cam follower 104 connected across and extending away from shaft 102.

A support member 106 supports a pick cam 108 near the retrievable position. Pick cam 108 has a lever 110 that is pivotally connected to support member 106 by a pivot 112 and is biased into the position shown by a spring 114. A cam surface 116, which is slanted and fixedly connected to lever 108 and is in the path of cam follower 104, has an incline 118, an incline 120, and an underside 122.

Support member 106 also supports a release cam 124 near the operative position. Release cam 124 has a lever 126 that is pivotally connected to support member 106 by a pivot 128 and is biased into the position shown by a spring 130. A cam surface 132, which is slanted and fixedly connected to lever 126 and is in the path of cam follower 104, has an incline 134, an incline 136, and an underside 138.

A drive mechanism 140 for moving the carriage 96 along guide rods 98 includes a stepper drive motor 142 which drives a continuous belt 144 that is coupled to carriage 96. Also shown is a stripper 146 which strips the diskette 18 from a depending member 147 (see FIG. 9) of the upper of jaws 94 as the pick head 92 releases the diskette 18 in the operative position.

Carriage 96 has a cam follower 148 which, when diskette 18 is in the operative position, causes a disk clamp mechanism 244 (see FIG. 15) to pivot downwardly and clamp diskette 18 on the spindle 22. This disk clamp mechanism 244 is released when carriage 96 and cam follower 148 move toward the retrievable position. Carriage 96 also has a flag 149a that is movable into an optical sensor 149b to signal that pick head 92 is in a home position, as will be further described.

Figure 9:
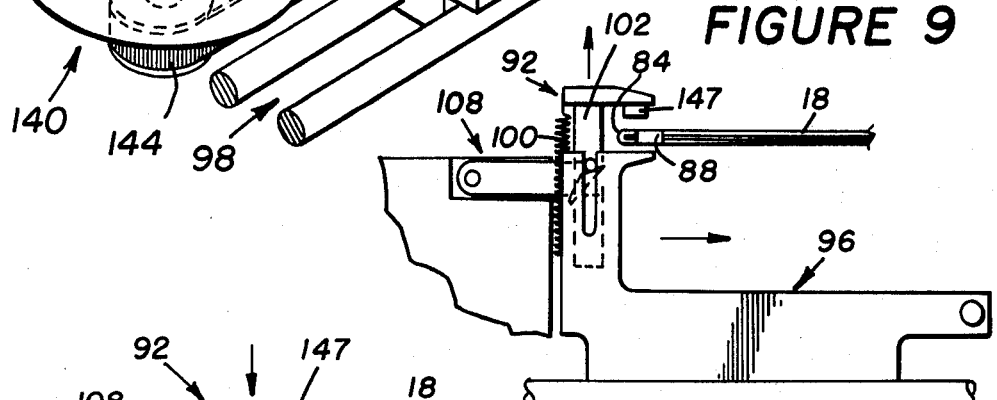
FIG. 9, FIG. 10 and FIG. 11 are illustrations of the picker mechanism, partially broken away, used to explain its operation.
Figure 10:
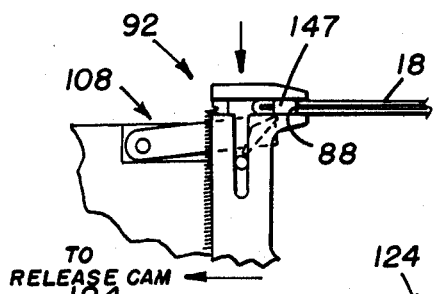

In the operation of the picker mechanism 20 to retrieve a diskette 18, and with reference to FIGS. 8–11, as the pick head 92 is driven in an outward or disk-out direction towards the retrievable position, cam follower 104 moves up incline 118 and then incline 120. This action opens jaws 94 against the bias of spring 100 (FIG. 9). Then, as pick head 92 is driven further in this direction, cam follower 104 moves off of incline 120, allowing spring 100 to bias jaws 94 closed through slot 88 and clamp diskette 18.

Then, pick head 92 is driven in the reverse or disk-in direction towards the operative position to move diskette 18 partially out of disk pack 42 and into edge guide 30. During this disk-in movement, cam follower 104 contacts underside 120 (FIG. 10) of pick cam 108 to pivot lever 110 upwards and allow pick head 92 to bypass pick cam 108 without opening jaws 94 which are clamping diskette 18.

Then, with reference to FIG. 8, as pick head 92 continues to be driven towards the operative position with diskette 18, cam follower 104 rides on incline 134 and incline 136 to again open jaws 94. As the jaws 94 open, depending member 147 tends to raise diskette 18 at its forward edge 150, but this edge 150 contacts the underside 151 of stripper 146 which strips diskette 18 from depending member 147, thereby allowing diskette 18 to lie flat around spindle 22 in the operative position. Pick head 92 then continues to be driven in the reverse or disk-in direction beyond the operative position so that cam follower 104 moves beyond incline 136, thereby allowing spring 100 to bias jaws 94 closed.

Figure 11:
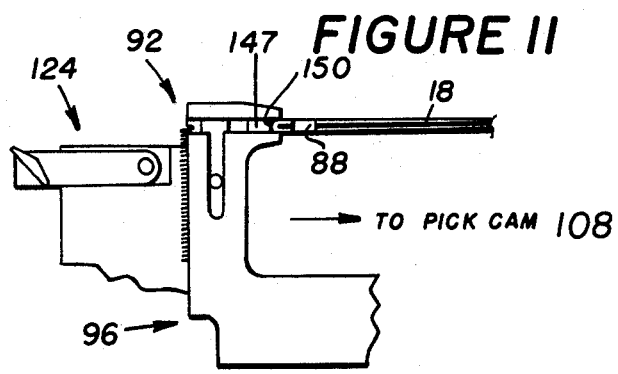

After the diskette 18 is used in the operative position and is to be replaced in the retrievable position, pick head 92 is again driven in the forward or disk-out direction from its last described position. Cam follower 104 contacts underside 138 of cam surface 132 to pivot lever 126 upwards and bypass release cam 124 without opening jaws 94. As shown in FIG. 11, as this disk-out movement continues, closed jaws 94 push on edge 150 via depending member 147 to move diskette 18 towards the retrievable position. As cam follower 104 then rides along incline 118 to begin opening jaws 94, which now lose contact with edge 150, carriage 96, and hence pick head 92, is driven no further, unlike when pick head 92 is moved to retrieve the diskette 18. The manner in which cam follower 104 is moved beyond cam surface 116 to retrieve diskette 18 and then moved only onto incline 118 to return diskette 18 to the retrievable position will be described below.

Then, at the position of cam follower 104 at which it is stopped on incline 118, groove 90 in diskette 18 starts to receive spring-biased detent 52 on disk pack 42. Detent 52 then rides into groove 90, forcing or drawing diskette 18 into the retrievable position. In addition to this function, detent 52 also maintains and aligns all of the diskettes 18 in the disk pack 42. As with stepper motor 80 which is used to pivot box 16, stepper motor 142 is energized under program control by the data processor to be described below.

FIG. 12 illustrates the data storage medium 86 of the diskette 18 that is used in conjunction with the position control device 24. The storage medium 86 is made of a material, such as Mylar, which will expand or contract in response to various temperature and humidity conditions. Another factor to be more fully discussed is that the diskette 18 may be slightly mis-clamped on the spindle 22 in the operative position such that the storage medium 86 may rotate slightly eccentrically.

The diskette 18 is manufactured or used with a reference datum shown generally at 152. As one example, the reference datum 152 is a single concentric reference or servo track 154. The reference track 154 has single frequency signal of, for example, 125 KHz written on it and is 0.0012" or 12 mils wide. Also included on the storage medium 86 for position control purposes are a plurality of sector holes 156, e.g., sixteen equiangularly spaced sector holes, although only every other or eight of the holes 156 need be utilized for position control purposes. An index hole 158 is also made on the storage medium 86 for indexing purposes. Storage medium 86 also has, for example, concentric data tracks $T_0$-$T_{153}$ on which to record data, each track $T_0$-$T_{153}$ being, for example, 0.004"±0.0002" wide with a center-to-center spacing of 0.0059" at 70° F. and 50% relative humidity. Among other things, expansion and contraction of the medium 86 will increase and decrease the center-to-center distance of the data tracks $T_0$-$T_{153}$, as well as move outwardly and inwardly the inner diameter (I.D.) of reference track 154.

FIG. 13 shows a curve or waveform 160 of the amplitude vs. width of the single, as outputted by the recording head 28, frequency signal from the inner diameter (I.D.) to the outer diameter (O.D.) of the reference track 154 at a given circumferential position of track 154. The waveform 160 has a generally level portion 162 of constant amplitude F that falls off over a linearly sloping portion 164 leading towards the I.D. Shown along the X-axis are four points $P_0$-$P_3$, at which waveform 160 has corresponding amplitude ratii $R_0$-$R_3$ which are the ratii of the amplitude of the frequency signal at points $P_0$-$P_3$ to the amplitude F of level portion 162. Thus, for example, $R_0$ equals the amplitude at $P_0$ divided by F, which is approximately 0.8. It should be noted that due to, for example, manufacturing tolerances, the amplitude F of the frequency signal written on reference track 154 may vary from one diskette 18 to another, or may vary along the circumference of track 154 of one diskette 18. However, the shape of waveform 160 will be substantially the same so that at corresponding points $P_0$-$P_3$ from the I.D., the ratii $R_0$-$R_3$ will be the same. That is, for example, $R_0$=0.8 will be the same for each waveform 160. Also to note on sloping portion 164 is a ratio $R_{RP}$, which is, for example, equal to 0.5 F and corresponds to a reference position (RP) of reference track 154.

FIG. 14 shows a position control circuit 166 of position control device 24 that may be used in conjunction with the data storage medium 86. Medium 86 is shown on the spindle 22 which can be rotated by a motor drive shown generally at 168. Also shown is the carriage 26, which is driven by a motor 170, such as a 1.8°, 4-phase, stepper motor, and the recording head 28.

Carriage 26 also carries a sensor 172 which is of a material that expands and contracts proportionally to the material of data storage medium 86 in response to temperature and humidity conditions. Preferably, sensor 172 is of the same material as the medium 86 so that if the latter is Mylar, then the former is Mylar. Sensor 172 has a readable scale 174 which constitutes a plurality of spaced apart scale lines or indicia 176. The spacing of scale lines 176 is such that there are 10 lines or pulses (pips) corresponding to the center-to-center distance between each adjacent data track $T_0$-$T_{153}$, and 20 lines or pulsess between reference position RP of reference track 154 and track $T_0$. Sensor 172 also has a carriage home marker 178, which indicates when the carriage 26 is in a home position. In this home position, as shown in FIG. 12 and FIG. 14, recording head 28 should always be substantially outside the O.D. of reference track 154. This home position is predetermined to account for worst case conditions in which the medium 86 may expand, causing the reference track 154 to move outwardly, or in which slight eccentric rotation of the medium 86 on spindle 22 may cause portions of reference track 154 to move outwardly towards head 28 in the home position.

A microprocessor 180, such as the Intel 8051, manufactured by Intel Corporation, Santa Clara, California, receives a home position signal from a fixed sensor 182 via a line 184, an amplifier 186 and a line 188. Sensor 182 is at the fixed position to sense marker 178 when carriage 26 is moved into the home position. A sector/index sensor 190, having a light source 192 and light sensor 194 disposed on opposite sides of medium 86, generates sector signals and index signals as sector holes 156 and index hole 158 rotate between source 192 and sensor 194. These sector and index signals are fed over a line 196, an amplifier 198 and a line 200 to an interrupt port of microprocessor 180. Recording head 28 produces an amplitude signal, as shown in FIG. 13, proportional to the amplitude of the frequency signal on reference track 154. This signal is coupled to an RF amplifier 202 over a line 204, whose output on a line 206 is coupled to a rectifier and peak detector 208 that generates a DC voltage signal proportional to the amplitude of the frequency signal. An A/D converter 210, under control by microprocessor 180 over a control line 212, converts the DC voltage output of detector 208 on a line 214 to a digital number which is fed on a data bus 216 to microprocessor 180.

A fixed quadrature scale sensor 218 senses each scale line 176 on scale 174 as the latter moves radially across medium 86. Sensor 218 produces four pulse signals on four lines 220 each time a scale line 176 moves outwardly or inwardly across sensor 218. Logic in a directional signal and pulse detector 222, in response to the information on lines 220, produces an outward/inward directional control signal on a line 224 and a pulse signal on a line 226 for each scale line 176. An up/down counter 228 is switched into an up-count state in response to the outward directional control signal on line 224 or a down-count state in response to the inward directional control signal on line 224, and counts each pulse on line 226. Under control by microprocessor 180 via a control line 230, counter 228, which may be a 16-bit counter, sends the count over data bus 216 to microprocessor 180.

As previously indicated, motor 170 is a 1.8°, 4-phase stepper motor which would move carriage 26 and hence head 28 a distance of 0.0059 inches for each full step of 1.8°. A motor control circuit shown generally at 232 includes a driver circuit 234 that controls motor 170 over four lines 235 by sourcing and sinking current to the two sets of coils (not shown) in motor 170. Driver circuit 234 receives a conventional 4-phase drive signal from microprocessor 180 over two lines 236. Given the four possible states of lines 236, four possible states of current flow directions exist for the two coils in motor 170. Motor 170 is locked at even stepped increments when a steady state condition exists with lines 236 fixed in any one of their four possible states. Motor 170 moves in full step increments given a change in state in one of the two lines 236 which results in corresponding changes in state of current flow to the motor coils over lines 235.

Under the control of a timer 240 and gating signals it generates on two lines 238, full step movements in motor 170 are divided by 100, such that corresponding movements in head 28 are 59 microinches of 1 1/100th of center-to-center tracks spacing. In particular, microprocessor 180 generates data words on data bus 216 and loads these into timer 240 with control line 242. These data words provide information for producing gating signals on lines 238 which result in driver circuit 234 driving current on lines 235 in a phase modulated fashion in one of the coils of motor 170 in a duty cycle ranging from 0 to 100%.

In the overall operation of position control circuit 166, under software control to be further described below, microprocessor 180 first activates motor control circuit 232 to drive motor 170 to move carriage 26 and hence head 28 in the outward direction towards the home position. When this home position is reached, sensor 182 detects marker 178, thereby to signal microprocessor 180 via amplifier 186. Microprocessor 180 then controls circuit 232 to deenergize motor 170 and stop the movement of carriage 26. During this outward movement, scale 174 has been moving across quadrature scale sensor 218. Thus, counter 228 has been placed in an up-count state and has been incremented with each passage of a scale line 176 across sensor 218 to store a count corresponding to this home position.

Thereafter, microprocessor 180 activates control circuit 232 to energize motor 170 to drive carriage 26 and head 28 in the inward direction towards reference track 154. During this movement, counter 228 is in the count-down state and has been decremented with each passage of a scale line 176 across sensor 218.

Assume now that head 28 has crossed the O.D. of reference track 154 and is moving across reference track 154 to produce level amplitude portion 162 of waveform 160. At each step of motor 170, and for one revolution of data storage medium 86, microprocessor 180 receives 8 sector signals via sensor 190 at its interrupt port to receive and store 8 data words from A/D converter 210 identifying the amplitude F at 8 corresponding circumferential locations of reference track 154. This sequence of stepping motor 170 and hence head 28 across level portion 162 and collecting 8 data words from A/D converter 210 at each step continues as head 28 approaches the I.D. of reference track 154 to produce sloping portion 164. If it is assumed that the amplitude F is constant across level portion 162 at each of the 8 circumferential locations, microprocessor 180 now identifies this as the reference track 154 and stores the value F for each of these 8 circumferential locations for later use.

Then, under control of microprocessor 180 and control circuit 232, head 28 is microstepped to produce sloping portion 164 and at each step the above-described sequence of obtaining 8 amplitude values or data words of the amplitude of waveform 160 is performed. Assume now, for example, that head 28 is at a position along portion 164 such that all 8 amplitude values are within the range <0.8F and > a value 5, i.e., the amplitude of the frequency signal along 8 circumferential positions is within this range. The value 5 represents a noise factor so that if an amplitude is detected that is equal to or less than this value, a reclamping occurs of diskette 18 on spindle 22, as will be described in connection with FIGS. 15-17. Also assume that data storage medium 86 is not rotating eccentrically and that if there is expansion or contraction it is uniform about the circumference. Finally, also assume that the value 0.5F corresponds to an absolue reference position RP for subsequently accurately locating the data tracks $T_0-T_{153}$.

Accordingly, at the present position of head 28 along portion 164, there are amplitude ratii $r_0-r_7$ at the 8 corresponding circumferential points on track 154 that are identical, these ratii being calculated by microprocessor 180 and equal to the amplitude along portion 164 divided by the previously determined amplitude F of level portion 162 at the 8 circumferential positions. Microprocessor 180 can then calculate the offset of head 28 at the 8 circumferential positions corresponding to $r_0-r_7$ from the absolute reference position corresponding to 0.5F. Moreover, a single count N presently in counter 228 for these 8 sectors identifies the present position of head 28.

More particularly, assume that the abovementioned offset of the position of head 28 from 0.5F corresponds to a distance equal to a count of 1 counted by counter 228. Microprocessor 180 then can calculate the position of data track $T_0$ (the outer data track), since it is predetermined that this track $T_0$ is 20 pips or scale lines 176 from the reference position RP of 0.5F. That is, microprocessor 180, having the count N, can then subtract 1 due to the offset and then subtract 20 to store the number representing the position of track $T_0$ relative to this reference position RP. Thereafter, microprocessor 180, in the manner previously described, can drive head 28 in the inward direction with scale 174 crossing sensor 218. When counter 228 has counted down 21 pips, 1 pip for the offset and 20 pips for the spacing between the reference position RP and the separation distance to track $T_0$, the count in counter 228 equals the number calculated by microprocessor 180. Microprocessor 180 can now stop the head 28, which will be centered on data track $T_0$. This, it can now be appreciated, is because sensor 174 and scale 176 have expanded or contracted the same amount as data storage medium 86. That is, there always are 20 pips between the reference position RP of reference track 154 and data track $T_0$, though the spacing between pips will increase or decrease, as will the spacing between these two tracks, with expansion or contraction. Note also that there will always be 10 pips between the centerlines of adjacent data tracks $T_0$–$T_{153}$.

A number of other factors can now be appreciated. The offset for each of the 8 sectors when count N occurs is individually determined. Thus, if the rotation of medium 86 is slightly eccentric, different offset values are calculated and stored for the 8 sectors. As the medium rotates, microprocessor 180 will move head 28 in accordance with the count in counter 228 to cause head 28 to follow the eccentricity of track $T_0$. Also, head 28 can be aligned with any other data track $T_1$–$T_{153}$ by moving carriage 26 until counter 228 has counted down by 10 for each data track to be crossed in seeking a new data track. A similar procedure occurs when moving head 28 from an inner data track to an outer data track, except counter 228 now counts up by 10 for each data track that is crossed.

The data storage medium 86 has been described as including data tracks $T_0$–$T_{153}$ as well as reference track 154. The position control circuit 166 has been described as functioning to move and align recording head 228 over any one of the data tracks $T_0$–$T_{153}$ relative to the reference track 154. However, it will be appreciated that the principles of this alignment technique can be employed with other disk drives in which, for example, there are a plurality of hard disks aligned on a spindle and a plurality of aligned recording heads for each of the disks. One of the disks can be a reference or servo disk having only the reference track 154, with the other disks having only the data tracks $T_0$–$T_{153}$. The position control circuit 166 with the recording head 28 can be used exclusively with the reference disk. As the recording head 28 is moved to positions relative to the reference track 154, the other recording heads will become aligned with their corresponding data tracks $T_0$–$T_{153}$. This assumes all of the disks on the spindle will expand and contract, and rotate eccentrically, if at all, to the same degree. Further, the position control circuit 166 can be used in connection with disks or diskettes having data track densities other than that indicated for medium 86.

Figure 15:
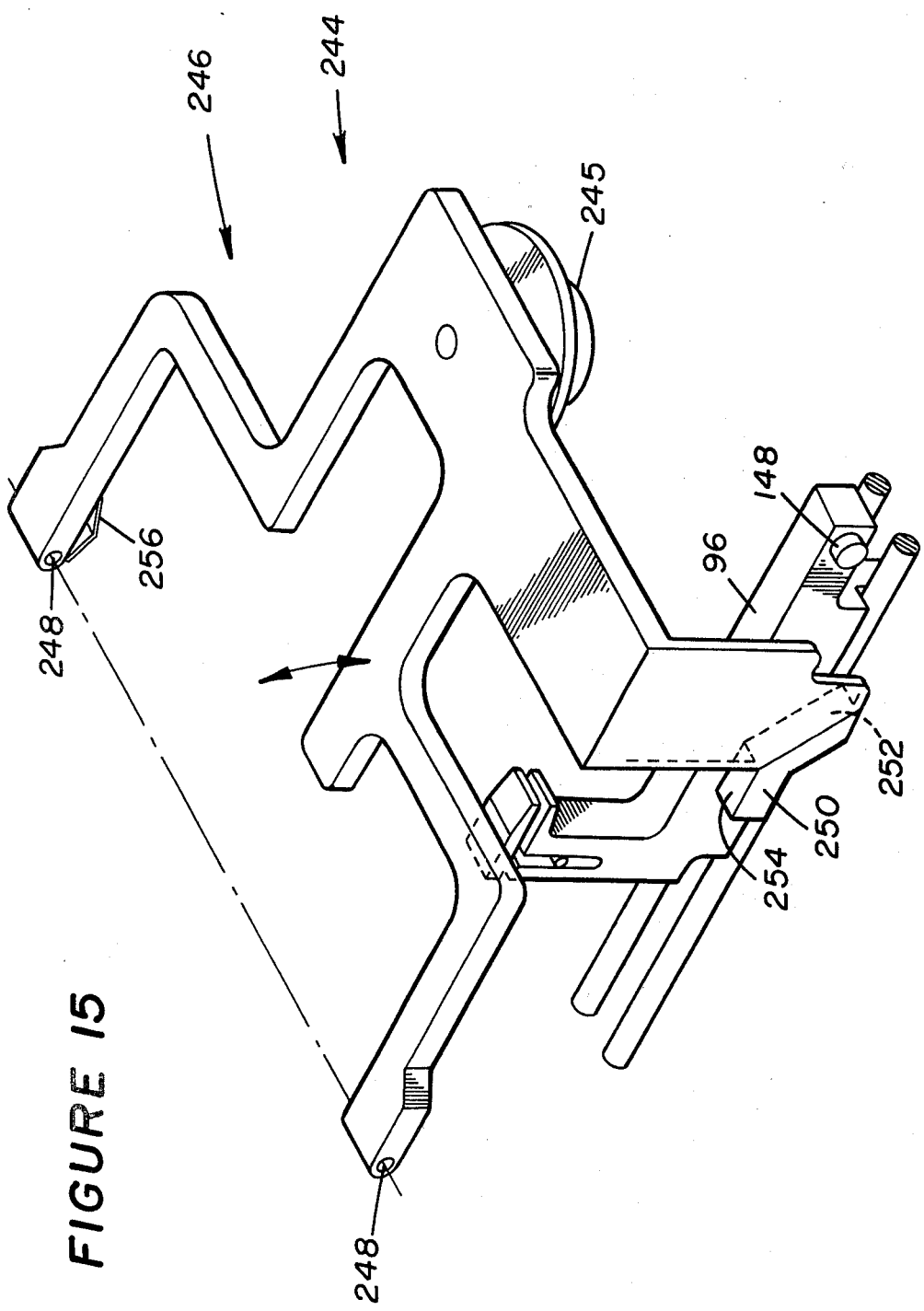
FIG. 15 is a perspective view of a disk clamp mechanism in combination with the picker mechanism.

FIG. 15 illustrates a disk clamp mechanism 244 that is used to clamp a diskette 18 onto spindle 22. Disk clamp mechanism 244 includes a clamp arm 246 that is pivotally mounted on base 14 at 248 and a disk clamp 245 that extends over spindle 22. Clamp arm 246 carries a cam 250 having a slanted cam surface 252 and a straight cam surface 254 on which cam follower 148, which is connected to pick head carriage 96 (see also FIG. 8), can ride. A spring 256 biases clamp arm 246 and, hence, disk clamp 245, to an upper or unclamped position, as shown in FIG. 16.

Figure 16:
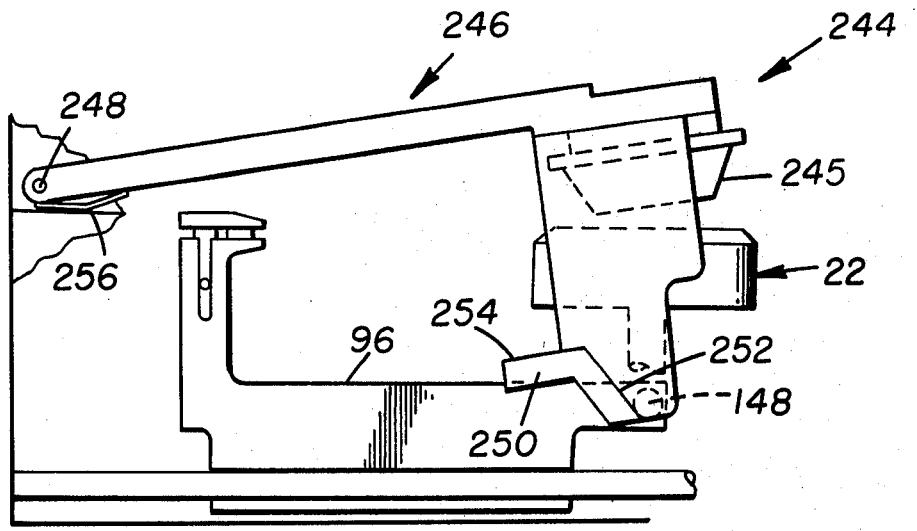
FIG. 16 and FIG. 17 are views used to explain the operation of clamping and reclamping a diskette on the spindle in the operative position.
Figure 17:
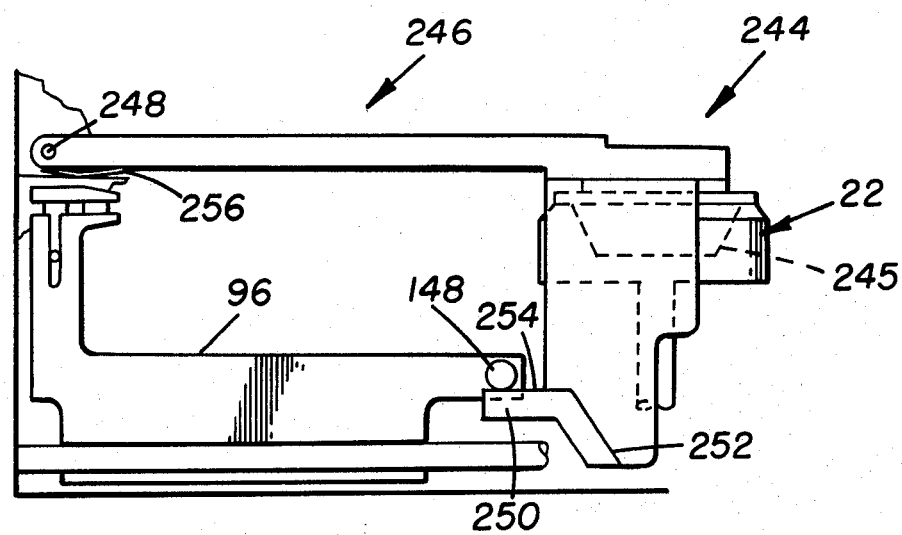

FIG. 16 shows the disk clamp mechanism 244 and the cam follower 148 when pick head 92 is moving in a direction towards the operative position. Then, as pick head 92 approaches the operative position, cam follower 148 rides along cam surface 252 to bias clamp arm 246 and disk clamp 245 downwardly against the bias of spring 256. As clamp follower 148 approaches the top of cam surface 252, diskette 18 becomes clamped on spindle 22. As pick head 92 continues moving beyond the operative position, cam follower 148 moves onto surface 254 to continue this disk clamping action, as shown in FIG. 17.

As previously mentioned in connection with position control circuit 166, the amplitude of waveform 160 being detected along portion 164 may not fall within the range <0.8F and > the value 5. This may be due to a relatively large misclamping of diskette 18 on spindle 22, resulting in a relatively large eccentric rotation. If this occurs, microprocessor 180, under program control, energizes motor 142 to move carriage 96, pick head 92 and cam follower 148 from the FIG. 17 position back towards a position at which cam follower 148 has partially moved down surface 252, but depending member 147 has not yet contacted surface 150 of diskette 18. Then, microprocessor 180 energizes motor 142 to move carriage 96, pick head 92 and cam follower 148 back to the FIG. 17 position. This action, it can be appreciated, will unclamp and then reclamp diskette 18 onto spindle 22. If this results in substantially accurate clamping of the diskette 18 on spindle 22 such that the above-mentioned amplitude range is satisfied after additional calculations by microprocessor 180, then no further reclamping action is performed. Otherwise, the reclamping action continues at least several times until such an amplitude range is satisfied.

As also previously mentioned, and with reference to FIG. 8, when head 92 is moved to retrieve a diskette 18 from disk pack 42, cam follower 104 moves over and beyond incline 118 and incline 120 of cam surface 116. However, when pick head 92 is moved to return a diskette 18, cam follower 104 moves only as far as, or onto, incline 118. Thic control of the movement or positioning of cam follower 104 occurs in the following manner.

Carriage 96 carries the flage 149a which moves into the optical sensor 149b. This is the "home" position of carriage 96, at which cam follower 104 is on the incline 118. When retrieving a diskette 18, under program control, microprocessor 180 energizes motor 142 to drive carriage 96 to its "home" position and this is sensed by microprocessor 180 via sensor 149b. Thus, microprocessor 180 knows where carriage 96 and pick head 92 are. Then, under program control, microprocessor 180 drives head 92 further towards the retrievable position. When the head 92 is then driven with diskette 18 towards the operative position, flag 149a is removed from optical sensor 149b so that again microprocessor 180 knows the position of head 92. Thereafter, when head 92 pushes on diskette 18 to return it to disk pack 42, flag 149a again is moved into optical sensor 149b at the "home" position at which cam follower 104 is on incline 118. Microprocessor 180, therefore, again knows of the position of carriage 96 and deenergizes motor 142 to stop further movement of head 92. The previously described detent 52 then draws diskette 18 into disk pack 42.

Similarly, when retrieving a diskette 18, the box 16, under program control, is moved to its home position at which flag 41a is moved into optical sensor 41b. This "home" position is the position where one of the grooves 60, for example, groove 60-1, is in the retrievable position. Microprocessor 180 thus knows the position of box 16. Then, under program control, motor 80 can be energized by microprocessor 180 to drive box 16 to position a desired groove 60 in the retrievable position in anticipation of retrieving a selected diskette 18.

While not shown, there also can be included as part of the disk drive 12 a similar flag and optical sensor to inform the microprocessor 180 when door 38 is opened and closed. If, for example, the door 38 is opned when a diskette 18 is in the operative position on spindle 22, microprocessor 180, under program control, can actuate picker mechanism 20 to drive diskette 18 back into disk pack 42 in the retrievable position.

Computer program listings for an 8080 microprocessor for performing the above-described functions are included as part of the specification at the end of the description and before the claims. A description of the title and general content of the listings is given below.

1. Command Input For PICPAC—This program implements the procedure for pivoting box 16 to bring a selected diskette into the retrievable position and for moving the selected diskette between the retrievable position and the operative position. It brings the above-described components into the "home" positions and controls the clamping and reclamping of the diskette to reduce or eliminate eccentric rotation.

2. Position Control Module—This program implements the procedure for compensating for expansion, contraction and eccentric rotation of the data storage medium 86 when moving the head 28, but assumes that amplitude F of level portion 162 is constant at each of the 8 circumferential locations along reference track 154.

To summarize the overall operation of disk drive 10, a disk pack 42 is loaded into tray 32 with the plurality of diskettes 18. Under software control, microprocessor 180 controls the pivoting of box 16 to move a selected one of the diskettes 18 into the retrievable position. Then, picker mechanism 20, under software control, is actuated to pick the one diskette 18 from the retrievable position, move it into the operative position, and clamp it or reclamp it on spindle 22. Then, under software control, spindle 22 is driven to rotate the data storage medium 86 and position control device 24 is actuated to seek and accurately follow the data track $T_0$–$T_{153}$, whether or not the medium 86 expands, contracts or rotates slightly eccentrically. After using the selected diskette 18, picker mechanism 20, under software control, moves the diskette 18 from the operative position to the retrievable position in anticipation of the selection of another diskette 18.

In addition to the advantages specifically described or indicated above, the picker mechanism 20 uses only a single motor 142 to move and clamp a selected diskette 18 on spindle 22. The process of picking a selected diskette 18 from the retrievable position, unclamping it from the picker mechanism 20 at the operative position, clamping the diskette 18 on spindle 22, unclamping the diskette 18 from spindle 22, and returning the diskette 18 to the retrievable position in disk pack 42 is synchronized by means of a mechanical picker mechanism 20 that requires only the one motor 142 to drive carriage 96. Furthermore, pick head 92 is not driven onto the edge 150 of diskette 18, but clamps the diskette 18 through slot 88 without causing wear or other damage to the jacket 84 and data storage medium 86. Nor does the pick head 92 hold the diskette 18 by friction.

Other aspects, objects and advantages of the invention can be obtained from a study of the drawings, the disclosure and the appended claims.

```
ORG     100H
        JMP     START
;COMMAND INPUT FOR PICPAC
;1/29/81
;DICK
;
RCB     EQU     0AH
CR      EQU     0DH
LF      EQU     0AH
GDSK    EQU     0F6E6H
ROG     EQU     700H
;
;
NEXTCH:
        MVI     C,1             ;CONSOLE IN COMMAND
        CALL    5H              ;CALL TO BIOS
        RET
CONOUT:
        MVI     C,2             ;CON OUTPUT COMMAND
        CALL    5H              ;BIOS ENTRY POINT
        RET
;
LINEIN:
        MVI     C,RCB           ;SET READ BUFF COMMAND
        LXI     D,KBDBUF        ;H=KBD BUFF
        CALL    5H              ;GO TO BIOS ENTRY POINT
        LDA     KBDBUF+2        ;GET COMMAND
        CPI     'X'             ;REAPEAT COMMAND ?
        RZ                      ;YES RETURN
        STA     SAVPTR+1        ;NO SAVE COMMAND AND
        LDA     KBDBUF+1        ;SAVE # OF CHARACTERS IN COMMAND
        STA     SAVPTR          ;AT SAVPTR
        RET
;
GETCH:
        XRA     A               ;CLR A
        LXI     H,KBDBUF+1      ;POINT TO # OF CHARACTERS IN BUFFER
```

```
        CMP     M                       ;NONE ?
        JZ      RETEND                  ;RIGHT RETURN ZERO
        DCR     M                       ;MORE CHARACTERS DECREMENT CHAR COUNT
        LHLD    KBDPTR                  ;H POINT TO CHAR IN BUFF
        MOV     A,M                     ;GET CHARACTER
        INX     H                       ;POINT TO NEXT CHARACTER
        SHLD    KBDPTR                  ;SAVE IT
        RET                             ;CHARACTER IN A
;
RETEND:
        LXI     H,KBDBUF+2              ;INITIALIZE KBD BUFF PTR
        SHLD    KBDPTR                  ;SAVE IT
        RET
;
;Reset character buffer for repeat command.
;
REPEAT:
        LDA     SAV$PTR                 ;Get # of characters in command
        STA     KBDBUF+1                ;Put it in buffer
        LDA     SAV$PTR+1               ;Get previous command
        STA     KBDBUF+2                ;Put it in buffer
        CALL    RETEND                  ;Reset keyboard pointer
        RET
;
;DO COMMAND UNTIL CR KEY
;
DOFE:
        MVI     C,0BH
        CALL    005
        ORA     A
        JZ      REPEAT
        JMP     GETMORE
;
PRTMSG:
        MOV     A,M                     ;GET CHAR FOR PRINT
        CPI     '*'
        RZ                              ;RETURN ON * CHAR
        MOV     E,A                     ;PUT CHAR IN E FOR SENDING
        PUSH    H                       ;SAVE STRING PTR
        CALL    CONOUT                  ;PRINT IT
        POP     H                       ;RESTORE STR PTR
        INX     H                       ;POINT TO NEXT CHAR
        JMP     PRTMSG
;
START:
        LXI     SP,100H
        CALL    D$SELECT                ;DISABLE PIC
        MVI     A,PAC
        CALL    D$SELECT
        LXI     D,0                     ;SET STEP TABLE PTR TO 0
        CALL    SET$STP                 ;INIT PHASE BITS IN PORT
        CALL    HOME$PIC
        CALL    STORE$DISC
        CALL    HOME$PAC
LOOP:
        LXI     H,INPRMT                ;POINT TO INPUT PROMPT
        CALL    PRTMSG                  ;OUTPUT STRING
        CALL    LINEIN                  ;GET LINE FROM CONSOLE
NEXT:
        LXI     H,NEXT
        PUSH    H
        CALL    GETCH                   ;GET CHARACTER FROM BUFFER
        ORA     A                       ;NO MORE CHARACTERS IN BUFF GET NEW COM
        JZ      GET$MORE                ;       MAND FROM BUFFER
        CPI     'D'
        JZ      DISC
        CPI     'H'
        JZ      HOME
        CPI     'X'
        JZ      REPEAT
        CPI     'R'
        JZ      DOFE
        CPI     'T'
        JZ      ROG
```

```
        CPI     ' '
        RZ
        JMP     BAD
;
DISC:
        CALL    GET$CH
        ORA     A
        JZ      GET$MORE
        LXI     B,0
        CPI     '0'
        JZ      GO$DISC
        INR     C
        CPI     '1'
        JZ      GO$DISC
        INR     C
        CPI     '2'
        JZ      GO$DISC
        INR     C
        CPI     '3'
        JZ      GO$DISC
        INR     C
        CPI     '4'
        JZ      GO$DISC
        CPI     'I'
        JZ      GET$DISC
        CPI     'O'
        JZ      STORE$DISC
        CPI     'R'
        JZ      RECLMP
        JMP     BAD
HOME:
        CALL    GET$CH
        ORA     A
        JZ      GET$MORE
        CPI     'P'
        JZ      HOME$PIC
        CPI     'B'
        JZ      HOME$PAC
        JMP     BAD
;
GET$MORE:
        POP     H
        CALL    RETEND
        JMP     LOOP
;
BAD:
        LXI     H,BAD$CMD
        CALL    PRTMSG
        JMP     GET$MORE
;
;
INPRMT: DB      CR,LF,'TYPE COMMAND' ,CR,LF,'*'
;
KBDPTR: DW      KBDBUF+2        ;KEYBOARD BUFFER POINTER
;
SAVPTR: DW      0               ;BUFFER FOR # OF CHARS IN COMMAND
;
BAD$CMD:    DB  0AH,0DH,'BAD COMMAND STRING, RETYPE',0AH,0DH,'*';
KBDBUF: DB      0FFH            ;KEYBOARD BUFFER GOES FROM HERE
REST    DS      0FEH                    ;FOR 256 BYTES
;Pac and pic routines
;1/29/81
;Dick
;
;ver 1.0
;
;
PORT$B2 EQU     0E9H
PORT$B1 EQU     0E5H
INP1    EQU     0FDH
PORT$A2 EQU     0E8H
PORT$1$CONT     EQU     0E7H
PAC$ENBL        EQU     0DH
```

```
PAC$DIS EQU     0CH
;
PIC$RATE        EQU     20
LOAD$RATE       EQU     7
CLMP$RATE       EQU     20
STRT$UN$CLMP$RATE       EQU     80
UN$CLMP$RATE    EQU     20
STRT$UN$CLMP$STPS       EQU     3
;
PAC$RATE        EQU     5
STRT$PAC$RATE   EQU     12
STRT$PAC$STPS   EQU     5
;
PIC$POS EQU     0
DELTA   EQU     12
PIC$HOM$POS     EQU     DELTA
NEW$PIC$POS     EQU     DELTA+4
DISC$IN$PAC     EQU     DELTA-2
REL$POS         EQU     DELTA+100
CLMP$POS        EQU     DELTA+135
NO$CLMP$POS     EQU     DELTA+115
PIC$SENSOR      EQU     04H
PAC$SENSOR      EQU     02H
PIC             EQU     0
PAC             EQU     1
;
FIXDLY          EQU     040H
;
FWD             EQU     1
REV             EQU     0
;
OFF$SET         EQU     18
;
;Get sensors from data buss.
;
GET$SENSORS:
        DI
        IN      PORT$B2
        PUSH    A
        ANI     INP1
        OUT     PORT$B2
        IN      PORT$B1
        MOV     B,A
        POP     A
        OUT     PORT$B2
        MOV     A,B
        EI
        RET
;
;Moves picker head out past home sensor
;
GO$OUT:
        STA     FWD$REV
        LDA     DLY$AMT
        STA     TMP
        MVI     A,PIC$RATE
        STA     DLY$AMT
        LXI     B,40
        CALL    H$LOOP
        LDA     TMP
        STA     DLY$AMT
        RET
;
;Delay 2 msec for each count in DLY$AMT.
;
DELAY:
        PUSH    B
        LDA     STRT$SLOW
        ORA     A
        LDA     STRT$DLY$AMT
        JNZ     DLYLP
        LDA     DLY$AMT
DLYLP:  MVI     B,FIXDLY
BLOOP:  DCR     B
```

```
        JNZ     BLOOP
        DCR     A
        JNZ     DLYLP
        POP     B
        RET
;
;Steps selected motor one step from current position
;in D in direction set by FWD$REV.
;
SND$STP:
        LDA     FWD$REV
        ORA     A
        DCX     D
        JZ      SET$STP
        INX     D
        INX     D
SET$STP:
        LXI     H,STP$TBL
        MOV     A,E
        ANI     03H
        ADD     L
        MOV     L,A
        JNC     SS
        INR     H
SS:     DI
        IN      PORT$A2
        ANI     09FH
        ORA     M
        OUT     PORT$A2
        EI
        CALL    DELAY
        RET
;
;Step selected device from CUR$POS to new position in D.
;
CMPL$H:
        MOV     A,L
        CMA
        MOV     L,A
        MOV     A,H
        CMA
        MOV     H,A
        RET
;
;resets start delay if we have gone STRTSTPS steps.
;
START$DELAY:
        LXI     H,STRT$STPS
        LDA     STRT$CTR
        INR     A
        STA     STRT$CTR
        CMP     M
        RNZ
        XRA     A
        STA     STRT$SLOW
        RET
;
STEP$IT:
        LHLD    CUR$POS
        CALL    CMPL$H
        DAD     D
        JNC     ST0
        MVI     A,FWD
        INX     H
        JMP     ST1
ST0:    CALL    CMPL$H
        MVI     A,REV
ST1:    STA     FWD$REV
        MOV     B,H
        MOV     C,L     ;# of steps to new position in B$C
        LHLD    CUR$POS
        XCHG
        XRA     A
        STA     STRT$CTR
```

```
H$LOOP:
        MOV     A,B
        ORA     A
        JZ      L$LOOP
        LDA     STRT$SLOW
        ORA     A
        CNZ     START$DELAY
        CALL    SND$STP
        DCX     B
        JMP     H$LOOP
L$LOOP:
        MOV     A,C
        ORA     A
LLP:    JZ      S$EXIT
        LDA     STRT$SLOW
        ORA     A
        CNZ     START$DELAY
        CALL    SND$STP
        DCR     C
        JMP     LLP
S$EXIT:
        XCHG
        SHLD    CUR$POS
        XCHG
        RET
;
;Selects PAC motor if B=1,PIC motor if B=0.
;
SELECT:
        LDA     PIC$PAC
        CMP     B
        LHLD    CUR$POS
        XCHG
        JZ      OK
        LHLD    TMP$POS
        SHLD    CUR$POS
        XCHG
        SHLD    TMP$POS
        CALL    SET$STP
OK:     MOV     A,B
        STA     PIC$PAC
        ORA     A
        DI
        JNZ     SEL$PAC
        IN      PORT$A2
        ANI     07FH
        OUT     PORT$A2
        EI
        RET
SEL$PAC:
        MVI     A,PAC$ENBL
        OUT     PORT$1$CONT
        MVI     A,PAC$RATE
        STA     DLY$AMT
        EI
        RET
;
;Disable selected motor.
;
D$SELECT:
        LDA     PIC$PAC
        ORA     A
        DI
        JNZ     D$SEL$PAC
        IN      PORT$A2
        ORI     80H
        OUT     PORT$A2
        EI
        RET
D$SEL$PAC:
        MVI     A,PAC$DIS
        OUT     PORT$1$CONT
        EI
        RET
;
```

```
;Select PIC motor and home it.
;
HOME$PIC:
        MVI     B,PIC
        CALL    SELECT
        MVI     A,PIC$RATE
        STA     DLY$AMT
;Home without selecting
PIC$HOME:
        CALL    GET$SENSORS
        ANI     PIC$SENSOR
        MVI     A,FWD
        CNZ     GO$OUT
        MVI     A,REV
        STA     FWD$REV
H$PIC$L:
        CALL    GET$SENSORS
        ANI     PIC$SENSOR
        JZ      STPR
        MVI     A,03H
        ANA     E
        JZ      H$EXT
STPR:   CALL    SND$STP
        JMP     H$PIC$L
H$EXT:  LXI     H,PIC$HOM$POS
        SHLD    CUR$POS
        XCHG
        CALL    D$SELECT
        RET
;
;Get the disc from pac, move it in to drive and clamp it
;
GET$DISC:
        MVI     A,PIC$RATE
        STA     DLY$AMT
        MVI     B,PIC
        CALL    SELECT
        LXI     D,PIC$POS
        CALL    STEP$IT
        MVI     A,LOAD$RATE
        STA     DLY$AMT
        LXI     D,REL$POS
        CALL    STEP$IT
        MVI     A,CLMP$RATE
        STA     DLY$AMT
        LXI     D,CLMP$POS
        CALL    STEP$IT
        CALL    D$SELECT
        RET
;
;Put disc back in pac, move picker to index pac position
;
STORE$DISC:
        MVI     B,PIC
        CALL    SELECT
        MVI     A,0FFH
        STA     STRT$SLOW
        MVI     A,STRT$UN$CLMP$RATE
        STA     STRT$DLY$AMT
        MVI     A,STRT$UN$CLMP$STPS
        STA     STRT$STPS
        MVI     A,UN$CLMP$RATE
        STA     DLY$AMT
        LXI     D,NO$CLMP$POS
        CALL    STEP$IT
        MVI     A,LOAD$RATE
        STA     DLY$AMT
        CALL    PIC$HOME
        MVI     B,PIC
        CALL    SELECT
        LXI     D,DISC$IN$PAC
        MVI     A,PIC$RATE
        STA     DLY$AMT
        CALL    STEP$IT
        MVI     A,LOAD$RATE
```

```
            STA     DLY$AMT
            LXI     D,NEW$PIC$POS
            CALL    STEP$IT
            CALL    D$SELECT
            RET
;
;reclamp the disc in the drive
;
RECLMP:
            MVI     B,PIC
            CALL    SELECT
            MVI     A,0FFH
            STA     STRT$SLOW
            MVI     A,STRT$UN$CLMP$RATE
            STA     STRT$DLY$AMT
            MVI     A,STRT$UN$CLMP$STPS
            STA     STRT$STPS
            MVI     A,UN$CLMP$RATE
            STA     DLY$AMT
            LXI     D,NO$CLMP$POS
            CALL    STEP$IT
            MVI     A,CLMP$RATE
            STA     DLY$AMT
            LXI     D,CLMP$POS
            CALL    STEP$IT
            CALL    D$SELECT
            RET
;
;Home the pac motor
;
HOME$PAC:
            MVI     B,PAC
            CALL    SELECT
            MVI     A,REV
            STA     FWD$REV
H$PAC$L:
            CALL    GET$SENSORS
            ANI     PAC$SENSOR
            JZ      STPB
            MVI     A,03H
            ANA     E
            JZ      EXTB
STPB:       CALL    SET$SLOW
            CALL    SND$STP
            JMP     H$PAC$L
EXTB:
            LXI     H,0
            SHLD    CUR$POS
            LHLD    DISC$TBL
            XCHG
            CALL    SET$SLOW
            CALL    STEP$IT
            CALL    D$SELECT
            RET
;
;Go to disk specified in B$C
;
GO$DISC:
            MOV     A,C
            RLC
            MOV     C,A
            PUSH    B
            MVI     B,PAC
            CALL    SELECT
            POP     B
            LXI     H,DISC$TBL
            DAD     B
            MOV     E,M
            INX     H
            MOV     D,M
            CALL    SET$SLOW
            CALL    STEP$IT
            CALL    D$SELECT
            RET
;
```

```
;SET UP FOR SLOW START OF PAC.
;
SET$SLOW:
        MVI     A,0FFH
        STA     STRT$SLOW
        MVI     A,STRT$PAC$RATE
        STA     STRT$DLY$AMT
        MVI     A,STRT$PAC$STPS
        STA     STRT$STPS
        RET
;
DISC$TBL:       DW      OFF$SET,116+OFF$SET,237+OFF$SET
                DW      350+OFF$SET,472+OFF$SET
TMP$POS:        DW      0
CUR$POS:        DW      0
TMP             DB      0
STP$TBL:        DB      60H,40H,0,20H
DLY$AMT         DB      2
FWD$REV:        DB      FWD
PIC$PAC:        DB      PIC
STRT$STPS:      DB      5
STRT$CTR:       DB      0
STRT$SLOW       DB      0
STRT$DLY$AMT    DB      3
;
END
        TITLE   'Position control module V02.02 DML 3/24/81'
        MACLIB  MACROS
; This code implements the position control functions required in
; the Amlyn drive.  It is called from the PL/I code.
        PUBLIC  DELTAPOS, GOPOS, CURPOS, HOMEHD
        PUBLIC  GO$NEW$POS, THERE?, PUT$NEWPOS
        EXTRN   DELAY, GETBPB, PUTBPB, PUTBPC, RDDRV, RDPOS
MAXuSTEP        EQU     31      ;32 logical microsteps = one half-step
STEPMASK        EQU     7       ;Mask for valid step numbers
; Parameters for the micro-stepping routine
DIRBIT          EQU     BIT1    ;Direction = inwards
HSBIT           EQU     BIT2    ;We're at a half-step position
FSBIT           EQU     BIT3    ;We're at a full-step position
; WARNING: Disk dependent parameters
TRACK$SIZE      EQU     10      ;Nominal number of units per track
SETTLE$SIZE     EQU     3       ;If we're this close, we wait
uSTEP$DLY       EQU     300     ;Delay after each micro-step
uSTEP$SETTLE    EQU     3225    ;3mS at end of a move
STEP$TIME       EQU     3225    ;Delay parameter for 3mS
                                ;at 1.075 MHz
SETTLE$TIME     EQU     32767   ;Full head-settling time
; DELTAPOS is called from PL/I with a 16-bit argument specifying
; the number of units that the drive is to move.
DELTAPOS:
        DE@HL                   ;Pick up the argument
        XCHG
        DE@HL
        NOINT
        LHLD    NEWPOS          ;Add the argument to NEWPOS
        DAD     D
        SHLD    NEWPOS          ;and make it the new position
        RSTINT
        CALL    GO$NEW$POS      ;Perform the move
        RET
; GOPOS moves the head to an absolute position.
GOPOS:
        DE@HL                   ;Get the argument
        XCHG
        DE@HL
        XCHG                    ;into H&L
        SHLD    NEWPOS
        CALL    GO$NEW$POS      ;Move it
        RET
; CURPOS returns the current position to a PL/I program.
; PUT$NEWPOS simply takes a new position in H&L and loads
; it into NEWPOS.
CURPOS:
        CALL    RDPOS           ;Return POSCTR to PL/I
```

```
            MOV     A,L             ;In case they're only looking
            RET                     ;at the lower 8 bits
PUT$NEWPOS:
            SHLD    NEWPOS          ;Store it off
            RET
; GO$NEW$POS is called to move the head until POSCTR equals
; NEWPOS.
GO$NEW$POS:
            CALL    DO$NEW$POS      ;Move the head
            LXI     H,uSTEP$SETTLE  ;Wait for it to damp
            CALL    DELAY
            CALL    DO$NEW$POS      ;and make sure it's there
            RET
; DO$NEW$POS performs a move of the head to bring POSCTR into
; conformance with NEWPOS. It has two stages. If the distance
; to be moved is at least a full step, it will move the head to
; the nearest full step in the desired direction and then keep
; moving the head in full steps until the remaining distance is
; less than a full step. When the distance is less than a full
; step, the head will be micro-stepped in the desired direction
; until it arrives at the desired position. Note that the distance
; to be moved is re-calculated each time through one of the loops.
; This allows an interrupt routine to modify NEWPOS during execution
; of the routine with the proper response.
DO$NEW$POS:
            CALL    CALCDST         ;Calculate distance to be moved
            RC                      ;Exit if the distance is zero
            SAVREG  H               ;Save a copy of the distance
            LXI     D,-(TRACK$SIZE+1) ;Are we at least a full step away?
            DAD     D
            JC      Fstep           ;Yes. Go full-step the head
            CALL    uSTEP           ;No. Micro-step it
            RSTREG  H               ;Get distance back again
            LXI     D,-(SETTLE$SIZE+1) ;Are we close?
            DAD     D
            JC      DO$NEW$POS      ;No. Go do it again
            LXI     H,uSTEP$DLY     ;Yes. Let it slow down
            CALL    DELAY
            JMP     DO$NEW$POS
Fstep:      RSTREG  H               ;Clean up the stack
            CALL    GOFSTEP         ;Go to nearest full step in desired direction
            LXI     H,STEP$TIME     ;Let it settle
            CNC     DELAY           ;if a move occurred
Fsloop:     CALL    CALCDST         ;Can we take another full step?
            LXI     D,-(TRACK$SIZE+1)
            DAD     D
            JNC     DO$NEW$POS      ;No. Go micro-step
            CALL    STEP            ;Yes. Go step the head
            LXI     H,STEP$TIME     ;and let it settle
            CALL    DELAY
            JMP     Fsloop
; GOFSTEP moves the head to the nearest full-step position in the
; direction indicated by DIRECT. If the head is already at a full-
; step position, it returns with the carry-bit set.
GOFSTEP:
            LDA     CURuSTEP        ;Are we there already?
            CPI     MAXuSTEP
            STC                     ;Assume we are
            JZ      Gofret          ;Yes. Do nothing
            LDA     DIRECT          ;Step increment is two if DIRECT
            ANI     2               ;is outward, and zero otherwise
            MOV     C,A             ;Save it
            LXI     H,CURSTEP       ;-1 if step is odd
            MOV     A,M
            RAR                     ;Get LSB of step into carry
            MOV     A,C
            SBI     0               ;and subtract the carry from the increment
            ADD     M               ;Add it to the step
            ANI     STEPMASK        ;Keep the step in range
            MOV     M,A             ;Save it off
            CALL    DOSTEP          ;and put it out to the hardware
            MVI     A,MAXuSTEP      ;Set CURuSTEP to the full-step position
            STA     CURuSTEP
            MVI     A,COUNTER1MODE  ;Tell the hardware
            OUT     COUNTERCONTROL
```

```
            LDA     uSTEP$TBL+MAXuSTEP
            OUT     COUNTER1
            ORA     A               ;Clear the carry bit
Gofret:     RET
; CALCDST calculates the remaining distance and leaves it
; in H&L.  In addition, it sets DIRECT appropriately if the distance
; is non-zero and returns with the carry bit set if it is zero.
; THERE? compares the current position with NEWPOS, returning with
; the carry bit clear if they are equal, and set if they aren't.
CALCDST:
            CALL    RDPOS           ;Get current position
            XCHG
            LHLD    NEWPOS          ;Get desired position
            MOV     A,L             ;HL = HL-DE
            SUB     E
            MOV     L,A
            MOV     A,H
            SBB     D
            MOV     H,A
            ORA     L               ;Don't change DIRECT if distance is zero
            JZ      Clcret          ;but return with the carry bit set
            MOV     A,H             ;Load DIRECT from sign of result
            RAL
            SBB     A
            STA     DIRECT
            JZ      Posdst          ;Form absolute value
            NEGHL
Posdst:     STC                     ;Return with the carry bit clear
Clcret:     CMC
            RET
THERE?:
            CALL    RDPOS           ;Load up current position and NEWPOS
            XCHG
            LHLD    NEWPOS
            MOV     A,L             ;Subtract them
            SUB     E
            MOV     L,A             ;We only need to save the lower byte
            MOV     A,H
            SBB     D
            ORA     L               ;A=0 if result is zero
            ADI     -1              ;If result is zero, return with carry clear
            RET
; uSTEP micro-steps the head by one in a direction determined
; by DIRECT.  (DIRECT = 0 moves the head outward, DIRECT = -1 moves it
; in.)  It is table driven, and the index into the table is
; defined as follows:
;
;       Bit 0 -- Current step is odd
;
;       Bit 1 -- Direction is inward
;
;       Bits 2, 3, and 4 --
;
;               000 -- Normal
;               001 -- CURuSTEP = 0 (Half-step if step is odd)
;               010 -- CURuSTEP = 1 (Half-step if step is even)
;               011 -- CURuSTEP = MAXuSTEP-1 (Full-step if step is odd)
;               100 -- CURuSTEP = MAXuSTEP (Full-step if step is even)
uSTEP:
            LXI     H,CURuSTEP      ;Pick up the current micro-step
            MOV     E,M             ;Form an index out of it
            MVI     D,0
            MOV     C,E             ;Save it for later
            LXI     H,uSTEP$CLASS   ;Get bits 2, 3, and 4
            DAD     D
            MOV     E,M             ;of the table index
            LDA     DIRECT          ;Add bit 1 from the direction
            ANI     DIRBIT
            ORA     E               ;Mix it in
            MOV     E,A             ;and save it
            LDA     CURSTEP         ;Now bit 0 from LSB of CURSTEP
            MOV     B,A             ;But save it first
            ANI     BIT0
            ORA     E               ;And do the mix
            MOV     E,A             ;Back to form the index
```

```
                LXI     H,STEP$INC      ;See if there's a step change
                DAD     D
                MOV     A,M
                ORA     A
                JZ      Nostep          ;There isn't
                ADD     B               ;There is.  Add it to the saved step value
                ANI     STEPMASK        ;Keep it in range
                STA     CURSTEP         ;Save it off
                SAVREG  (B,D)
                CALL    DOSTEP          ;and put it out to the hardware
                RSTREG  (D,B)
Nostep:         LXI     H,uSTEP$INC     ;Now add in the micro-step change
                DAD     D
                MOV     A,M
                ADD     C
                STA     CURuSTEP        ;and save the result
                MOV     E,A             ;Translate from logical to physical
                MVI     A,COUNTER1MODE  ;But first set up the counter
                OUT     COUNTERCONTROL
                LXI     H,uSTEPTBL
                DAD     D
                MOV     A,M             ;Get the physical value
                OUT     COUNTER1        ;Put it out to the counter
                RET
uSTEP$CLASS:
                DB      004H
                DB      008H
                REPT    28
                DB      0
                ENDM
                DB      00CH
                DB      010H
STEP$INC:
                DB      0,  0,  0,  0   ;Neither half-step nor full-step
                DB      0, -1,  1,  0   ;CURuSTEP = 0
                DB      0,  0,  1,  0   ;CURuSTEP = 1
                DB      0,  0,  0,  1   ;CURuSTEP = MAXuSTEP-1
                DB     -1,  0,  0,  1   ;CURuSTEP = MAXuSTEP
uSTEP$INC:
                DB      1, -1, -1,  1   ;Normal
                DB      1,  1,  1,  1   ;CURuSTEP = 0
                DB      1, -1, -1,  1   ;CURuSTEP = 1
                DB      1, -1, -1,  1   ;CURuSTEP = MAXuSTEP-1
                DB     -1, -1, -1, -1   ;CURuSTEP = MAXuSTEP
uSTEP$TBL:
                DB       1,  5,  9, 13, 15, 17, 19, 21
                DB      23, 25, 27, 29, 31, 33, 35, 37
                DB      39, 42, 45, 48, 51, 54, 57, 61
                DB      65, 69, 73, 77, 82, 87, 93,100
; STEP moves the head by one full step in the direction determined
; by DIRECT.  Note that it is the responsibility of the calling
; routine to wait an appropriate length of time before trying
; to move the head again.
STEP:
                MVI     E,-2            ;Assume DIRECT = 0 and set increment
                LDA     DIRECT          ;Test the assumption
                ORA     A
                JP      Stpout          ;Right.  Leave it alone
                MVI     E,2             ;Wrong.  Change it
Stpout:         LDA     CURSTEP         ;Alter the current step
                ADD     E
                ANI     STEPMASK        ;Keep it in range
                STA     CURSTEP
                CALL    DOSTEP          ;Reflect it in the hardware
                RET
; DOSTEP takes a logical step position in the accumulator,
; translates it to a physical value, and puts it out to the
; hardware.
DOSTEP:
                MOV     E,A             ;Make of the value a table index
                MVI     D,0
                LXI     H,STEPTBL       ;Perform the translation
                DAD     D
                MOV     A,M
                CALL    PUTBPC          ;Output it
                RET
```

```
STEPTBL:
        DB      4,6,2,3,7,5,1,0   ;Translation table -- logical
                                  ;to physical
; HOMEHD puts the head into the position from which to start
; looking for the outer servo track. It first moves the
; head outward to the nearest full-step position.
; It then steps outward in full steps until
; the drive track zero sensor is true and CURSTEP is 0.
HOMEHD:
        XRA     A                 ;Set step direction
        STA     DIRECT            ;to outward
        CALL    GOFSTEP           ;Go to the nearest full step
        LXI     H,STEP$TIME       ;and let it settle
        CNC     DELAY             ;if we moved
Fulstp: CALL    RDDRV             ;Track zero sensor set?
        ANI     TRACK0
        JNZ     Gostep            ;No. Go move the head
        LDA     CURSTEP           ;Yes. Are we at step 0?
        ORA     A
        JZ      Hdhome            ;Yes. We're done
Gostep: CALL    STEP              ;Not yet. Step out and try again
        LXI     H,STEP$TIME       ;Wait for it to settle
        CALL    DELAY
        JMP     Fulstp
Hdhome: LXI     H,SETTLE$TIME     ;Let it quiet down
        CALL    DELAY
        CALL    GETBPB            ;Clear the position counter
        SAVREG  PSW
        ORI     CLRPOS
        CALL    PUTBPB
        RSTREG  PSW
        CALL    PUTBPB
        LXI     H,0               ;and NEWPOS
        SHLD    NEWPOS
        RET
        DSEG
NEWPOS: DW      0                 ;Position to which to move
DIRECT: DB      0                 ;Direction of desired move
                                  ;0 = outward, -1 = inward
CURSTEP:
        DB      0                 ;Current step
CURuSTEP:
        DB      MAXuSTEP          ;Current micro-step
        END
        TITLE   'Segment Module V00.07  DML 3/11/81'
        MACLIB  MACROS
; This module contains the code having to do with index
; pulses and segment interrupts. It contains the segment
; interrupt handler and the routines which find, start,
; interrupt, and stop index pulses.
        PUBLIC  SEGINT, CURSEG, STOPIP, STRTIP, INTIP, SYNCIP
        EXTRN   SEGFSM, GETBPA, PUTBPA, STRTCK, STOPCK
; States. Used as indeces into a table, so increment by two.
SYNC$FIND       EQU     0
INDEX           EQU     2
SEGMENT         EQU     4
SEGMASK         EQU     0FH       ;Mask for valid segment numbers
INDX$TIME       EQU     8400      ;Timer count to seperate index pulses
; SEGINT is the segment interrupt code. It maintains
; CURRENT$SEGMENT, calls the Segment Finite State Machine
; if appropriate, and controls the passing through of
; the index pulses to the controller.
SEGINT:
        EI
        SAVREG  (PSW,B,D,H)
        LXI     D,STATE$VEC       ;Go to the appropriate routine
        LHLD    STATE
        DAD     D
        DE@HL
        XCHG
        CALL@HL                   ;Do it
        RSTREG  (H,D,B,PSW)
        RET
STATE$VEC:
        DW      GTSYNC            ;SYNC$FIND
```

```
        DW      DOIP            ;INDEX
        DW      DONOTIP         ;SEGMENT
; GTSYNC is the routine for the interrupt handler in
; SYNC$FIND state.
GTSYNC:
        CALL    STOPCK          ;Get the time from the last pulse
        JC      Notsyn          ;If the clock hasn't been started yet
        LXI     D,-INDX$TIME    ;Check the interval
        DAD     D
        JC      Notsyn          ;It was long. This isn't it
        XRA     A               ;Eureka. Set CURRENT$SEGMENT to zero
        STA     CURRENT$SEGMENT
        LXI     H,SEGMENT       ;and the state to normal
        SHLD    STATE
        JMP     Gtsret          ;Finish up and leave
Notsyn: CALL    STRTCK          ;Reset the timer and start it up again
Gtsret: SNDEOI
        RET
; DOIP handles the interrupt when this is an index pulse.
DOIP:
        NOINT
        CALL    GETBPA          ;Gate the pulses off from the controller
        ANI     NOT DRVSTATENA
        CALL    PUTBPA
        RSTINT
        LXI     H,SEGMENT       ;Reset the state
        SHLD    STATE
        SNDEOI
        RET
; DONOTIP handles the interrupt when this is a normal segment interrupt.
DONOTIP:
        LDA     CURRENT$SEGMENT ;Advance the segment counter
        INR     A
        ANI     SEGMASK         ;Keep it in range
        STA     CURRENT$SEGMENT
        CZ      INDEX$NEXT      ;If an index pulse is coming up
        SNDEOI                  ;Allow the segment routine to be interrupted
        LDA     CURRENT$SEGMENT ;If the current segment is even
        ANI     BIT0
        CZ      SEGFSM          ;Process it in the PL/I code
        RET
; INDEX$NEXT examines IPFLAG to see what to do about the upcoming index
; pulse. IPFLAG = -1 causes the index pulse to be passed through to
; the controller. IPFLAG = 1 causes the pulse to be locked out.
; IPFLAG = 0 causes this one to be skipped, but succeeding ones
; to be let through.
INDEX$NEXT:
        LXI     H,INDEX         ;Change the state
        SHLD    STATE
        LDA     IPFLAG          ;See what we're supposed to do
        ORA     A
        JM      Indxon          ;-1. Pass it on
        JNZ     Inret           ;1. Leave it locked out
        DCR     A               ;0. Ignore this one and reset the flag
        STA     IPFLAG
        JMP     Inret
Indxon: NOINT
        CALL    GETBPA          ;Enable the index pulse back to the controller
        ORI     DRVSTATENA
        CALL    PUTBPA
        RSTINT
Inret:  RET
; These routines are all PL/I callable. CURSEG returns the current
; segment number. STOPIP, STRTIP, INTIP, and SYNCIP stop, start,
; interrupt, and find the index pulses.
CURSEG:
        LDA     CURRENT$SEGMENT
        ORA     A               ;Divide it by two for PL/I
        RAR
        MOV     L,A             ;PL/I wants it in both A and HL
        MVI     H,0
        RET
STOPIP:
        MVI     A,1             ;Disable index pulses until
        STA     IPFLAG          ;STRTIP is called
        RET
```

```
STRTIP:
        MVI     A,-1            ;Enable index pulses
        STA     IPFLAG
        RET
INTIP:
        LDA     IPFLAG          ;If the index pulses are now enabled
        CPI     -1
        JNZ     Invld
        XRA     A               ;;Stop just the next one
        STA     IPFLAG
Invld:  RET
SYNCIP:
        LXI     H,SYNC$FIND     ;Set the state to find the index
        SHLD    STATE
Wtsync: LHLD    STATE           ;and wait until it's been found
        MOV     A,L
        CPI     LOW SYNC$FIND
        JZ      Wtsync
        RET
        DSEG
STATE:  DW      SYNC$FIND       ;State variable for interrupt handler
CURRENT$SEGMENT:
        DB      0
IPFLAG: DB      1               ;Index pulse lock flag
                                ;1 = Lock
                                ;0 = Lock and enable next one
                                ;-1 = Enable
        END
```

```
/*
Segment Finite State Machine  DML  V00.18  3/24/81
This file contains the state machine activated when there
is a segment clock interrupt. It is extremely simple.
The machine has four states.
In the IDLE state, it does nothing.
In the SERVO_READ state, it records one revolution's worth
of servo information and returns to the IDLE state.
In the TRACK_FOLLOW state, it pulls a correction value
out of the CORRECTION table and, if it is different
from the current one, moves the head by the difference.
In the END_TRACK_FOLLOW state, it moves the head back to
the position it was in when track-following started,
and sets the state to IDLE.
*/
SEGMENT_FINITE_STATE_MACHINE:
    PROCEDURE;
    %INCLUDE 'DEFINES.PLI';
    %INCLUDE 'DSKDEF.PLI';
    %REPLACE
        IDLE BY 1,
        SERVO_READ BY 2,
        TRACK_FOLLOW BY 3,
        END_TRACK_FOLLOW BY 4;
    DECLARE
        (
        STATE, END_SEGMENT,
        CURRENT_CORRECTION,
        TDPTR POINTER,
        CORRECTION (0:MAX_SEGMENT)
        ) STATIC,
        STATE_VECTOR (4) ENTRY VARIABLE STATIC;
    DECLARE
        CURSEG ENTRY RETURNS (FIXED BINARY),
        SELSRV ENTRY (FIXED BINARY),
        GETAD ENTRY RETURNS (FIXED BINARY),
        DELTAPOS ENTRY (FIXED BINARY);
    INSFSM:    /* Initialize the Segment FSM */
        PROCEDURE EXTERNAL;
        STATE_VECTOR(IDLE) = DO_IDLE;
        STATE_VECTOR(SERVO_READ) = DO_SERVO_READ;
        STATE_VECTOR(TRACK_FOLLOW) = DO_TRACK_FOLLOW;
        STATE_VECTOR(END_TRACK_FOLLOW) = DO_END_TRACK_FOLLOW;
        STATE = IDLE;
        END INSFSM;
    SEGFSM:    /* Segment Finite State Machine */
        PROCEDURE EXTERNAL;
```

```
        CALL STATE_VECTOR(STATE) ();
        END SEGFSM;
GTSRVO:     /* Read a track of servo data */
    PROCEDURE (TRACK_DATA) EXTERNAL;
    DECLARE
        TRACK_DATA (0:MAX_SEGMENT) FIXED;
    TDPTR = ADDR(TRACK_DATA);
    CALL SELSRV(F_OUTER);
    STATE = SERVO_READ;
    END_SEGMENT = CURSEG();
    DO WHILE (STATE = SERVO_READ);
    END;
    END GTSRVO;
SET_CORRECTION:
    PROCEDURE (NEW_CORRECTIONS) EXTERNAL;
    DECLARE
        NEW_CORRECTIONS (0:MAX_SEGMENT) FIXED;
    DECLARE
        SEG FIXED (7);
    DO SEG = 0 TO MAX_SEGMENT;
        CORRECTION(SEG) = NEW_CORRECTIONS(SEG);
    END;
    END SET_CORRECTION;
STARTTRACKFOLLOW:
    PROCEDURE EXTERNAL;
    DECLARE
        SEG FIXED(7);
    CURRENT_CORRECTION = 0;
    STATE = TRACK_FOLLOW;
    SEG = CURSEG();
    DO WHILE (SEG = CURSEG());
    END;
    END STARTTRACKFOLLOW;
STOPTRACKFOLLOW:
    PROCEDURE EXTERNAL;
    IF STATE = TRACK_FOLLOW THEN
        DO;
            STATE = END_TRACK_FOLLOW;
            DO WHILE (STATE = END_TRACK_FOLLOW);
            END;
        END;
    END STOPTRACKFOLLOW;
SET_SEGFSM_IDLE:
    PROCEDURE EXTERNAL;
    STATE = IDLE;
    END SET_SEGFSM_IDLE;
DO_IDLE:
    PROCEDURE;
    ;
    END DO_IDLE;
DO_SERVO_READ:
    PROCEDURE;
    DECLARE
        TRACK_DATA (0:MAX_SEGMENT) FIXED BASED (TDPTR);
    TRACK_DATA(CURSEG()) = GETAD();
    IF CURSEG()=END_SEGMENT THEN
        STATE = IDLE;
    END DO_SERVO_READ;
DO_TRACK_FOLLOW:
    PROCEDURE;
    DECLARE
        (NEW_CORRECTION, DISTANCE) FIXED;
    NEW_CORRECTION = CORRECTION(CURSEG());
    DISTANCE = NEW_CORRECTION-CURRENT_CORRECTION;
    IF DISTANCE ¬= 0 THEN
        DO;
            CALL DELTAPOS(DISTANCE);
            CURRENT_CORRECTION = NEW_CORRECTION;
        END;
    END DO_TRACK_FOLLOW;
DO_END_TRACK_FOLLOW:
    PROCEDURE;
    CALL DELTAPOS(-CURRENT_CORRECTION);
    STATE = IDLE;
    END DO_END_TRACK_FOLLOW;
```

```
    END SEGMENT_FINITE_STATE_MACHINE;
/*
Servo Reading and Interpreting code.  V01.07  DML  3/24/81
This file contains all the code having to do with the
track-following servo except for the code executed upon
segment interrupts which is in the segment finite state
machine (SEGFSM).
*/
SRVO_MODULE:
    PROCEDURE;
    %INCLUDE 'DEFINES.PLI';
    %INCLUDE 'DSKDEF.PLI';
    /* Global data */
    DECLARE
        (
        TRACK_DATA (0:MAX_SEGMENT) FIXED,
        SERVO_DATA (0:MAX_SEGMENT) FLOAT,
        CORRECTIONS (0:MAX_SEGMENT) FIXED,
        (TRACK_OFFSET, UPPER_LIMIT, INNER_SERVO_POS, OUTER_SERVO_POS) FIXED,
        CALIBRATION FLOAT,
        DC_OFFSET FIXED INITIAL (0)
        ) STATIC;
/* External routines */
DECLARE
    GOPOS ENTRY (FIXED),
    SET_CORRECTION ENTRY ((0:MAX_SEGMENT) FIXED),
    HOMEHD ENTRY,
    CURPOS ENTRY RETURNS (FIXED),
    DELTAPOS ENTRY (FIXED),
    PLIDLY ENTRY (FIXED),
    SETPOS ENTRY (FIXED),
    SELSRV ENTRY (FIXED),
    GETAD ENTRY RETURNS (FIXED),
    GTSRVO ENTRY ((0:MAX_SEGMENT) FIXED);
/*
SERVOINITIALIZE is the power-up routine for this module.
It makes sure that an INITIAL_SERVO_READ will be performed
the first time a disk is loaded.
*/
SERVOINITIALIZE:
    PROCEDURE EXTERNAL;
    OUTER_SERVO_POS = 0;
    END SERVOINITIALIZE;
/*
DOSERVOREAD is the routine called from outside to find the
servo track and set up the CORRECTIONS table used for mis-
clamp correction by the segment fsm.
*/
DOSERVOREAD:
    PROCEDURE EXTERNAL;
    IF OUTER_SERVO_POS = 0 THEN
        CALL INITIAL_SERVO_READ;
    ELSE
        IF ~NORMAL_SERVO_READ() THEN
            CALL INITIAL_SERVO_READ();
    END DOSERVOREAD;
/*
GETOUTERSERVOPOS simply returns the outer servo
position to an external routine.
*/
GETOUTERSERVOPOS:
    PROCEDURE EXTERNAL RETURNS (FIXED);
    RETURN (OUTER_SERVO_POS);
    END GETOUTERSERVOPOS;
/*
NORMAL_SERVO_READ is the routine normally used when a disk
is loaded.  It assumes that it will be able to read the
outer servo track at the same place it did last time.  If
it can't, it returns a failure indication.  If it can, it
reads the track and re-calculates the mis-clamp CORRECTIONS
table.
*/
NORMAL_SERVO_READ:
    PROCEDURE RETURNS (BIT(1));
```

```
DECLARE
    (TOO_FAR_IN, TOO_FAR_OUT) BIT(1);
CALL GOPOS(OUTER_SERVO_POS);
CALL PLIDLY(SETTLE_TIME);
CALL GET_SERVO(TOO_FAR_IN, TOO_FAR_OUT);
IF TOO_FAR_IN : TOO_FAR_OUT THEN
    RETURN (FALSE);
CALL GET_CORRECTION();
CALL SET_CORRECTION(CORRECTIONS);
RETURN (TRUE);
END NORMAL_SERVO_READ;
/*
INITIAL_SERVO_READ is the routine which performs a full-
enchilada servo read. It is invoked at start-up and at
any other time when the normal algorithm fails or the
controller requests a recalibration. It begins by
calibrating the outer channel and recording its
gain. (It assumes that the servo dc offset has been
read before the spindle was turned on at power-up.)
It then reads both the outer and inner servo tracks,
records their positions, calculates the growth factor
to compensate for thermal and hygroscopic growth of
the disk, and calculates the current clamping error
correction.
*/
INITIAL_SERVO_READ:
    PROCEDURE;
    DECLARE
        FOUND_FLAG BIT(1),
        (TOO_FAR_IN, TOO_FAR_OUT) BIT(1);
    CALL HOMEHD();
    CALL PLIDLY(SETTLE_TIME);
    CALL CALIBRATE_SERVO(CALIBRATION, FOUND_FLAG);
    CALL GET_SERVO(TOO_FAR_IN, TOO_FAR_OUT);
    CALL GET_CORRECTION();
    CALL SET_CORRECTION(CORRECTIONS);
    OUTER_SERVO_POS = CURPOS()+TRACK_OFFSET;
    END INITIAL_SERVO_READ;
/*
CALIBRATE_SERVO is entered with the head presumed to be
just outside one of the servo tracks. It makes a sweep
inward to try to locate a valid servo track and if it
finds one, sets CALIBRATION to the maximum value found
on the outer portion of it.
It also returns a success or failure indication.
*/
CALIBRATE_SERVO:
    PROCEDURE (CALIBRATION, FOUND_FLAG);
    DECLARE
        CALIBRATION FLOAT,
        FOUND_FLAG BIT(1);
    DECLARE
        (I, SEG) FIXED(7),
        (MAX_LEVEL, SAMPLE, MAX_THIS_TRY) FIXED,
        AT_EDGE BIT(1);
    MAX_LEVEL = 0;
    CALIBRATION = 0.0E0;
    FOUND_FLAG = FALSE;
    DO I = 1 TO MAX_TRIES WHILE (~FOUND_FLAG);
        MAX_THIS_TRY = 0;
        CALL GTSRVO(TRACK_DATA);
        DO SEG = 0 TO MAX_SEGMENT;
            SAMPLE = TRACK_DATA(SEG)-DC_OFFSET;
            IF SAMPLE > CAL_TRIVIAL THEN
                MAX_THIS_TRY = MAX(MAX_THIS_TRY, SAMPLE);
        END;
        MAX_LEVEL = MAX(MAX_LEVEL, MAX_THIS_TRY);
        IF MAX_LEVEL > MAX_THIS_TRY+HYSTERESIS THEN
            FOUND_FLAG = TRUE;
        ELSE
            CALL DELTAPOS(TRY_DELTA);
    END;
    IF ~FOUND_FLAG THEN
        RETURN;
    UPPER_LIMIT = (MAX_LEVEL*8+5)/10;
```

```
        AT_EDGE = FALSE;
        DO WHILE (~AT_EDGE);
            AT_EDGE = TRUE;
            CALL GTSRVO(TRACK_DATA);
            DO SEG = 0 TO MAX_SEGMENT;
                SAMPLE = TRACK_DATA(SEG)-DC_OFFSET;
                IF (SAMPLE <= TRIVIAL) ! (SAMPLE > UPPER_LIMIT) THEN
                    AT_EDGE = FALSE;
            END;
            IF ~AT_EDGE THEN
                CALL DELTAPOS(TRY_DELTA);
        END;
        CALIBRATION = MAX_LEVEL;
        END CALIBRATE_SERVO;
/*
GET_SERVO attempts to read a servo track at the current
head location.  It checks for success (the presence of
valid values all the way around the track) and, if successful,
returns the outer levels divided by CALIBRATION.
*/
GET_SERVO:
    PROCEDURE (TOO_FAR_IN, TOO_FAR_OUT);
    DECLARE
        (TOO_FAR_IN, TOO_FAR_OUT) BIT(1);
    DECLARE
        SAMPLE FIXED,
        SEG FIXED(7);
    TOO_FAR_IN = FALSE;
    TOO_FAR_OUT = FALSE;
    CALL GTSRVO(TRACK_DATA);
    DO SEG = 0 TO MAX_SEGMENT;
        SAMPLE = TRACK_DATA(SEG)-DC_OFFSET;
        TRACK_DATA(SEG) = SAMPLE;
        IF SAMPLE <= TRIVIAL THEN
            TOO_FAR_IN = TRUE;
        IF SAMPLE > UPPER_LIMIT THEN
            TOO_FAR_OUT = TRUE;
    END;
    IF ~TOO_FAR_IN & ~TOO_FAR_OUT THEN
        DO SEG = 0 TO MAX_SEGMENT;
            SERVO_DATA(SEG) = FLOAT(TRACK_DATA(SEG))/CALIBRATION;
        END;
    END GET_SERVO;
/*
GET_CORRECTION transforms the ratios in SERVO_DATA into the
mis-clamp correction values in CORRECTIONS.  At the same
time, it calculates the amount by which the center of the
servo track is offset from the position of the head when
the track was read, and stores this in TRACK_OFFSET.
*/
GET_CORRECTION:
    PROCEDURE;
    DECLARE
        NSEGS FLOAT,
        SEG FIXED(7);
    DO SEG = 0 TO MAX_SEGMENT;
        CORRECTIONS(SEG) = DSTCVT(SERVO_DATA(SEG));
    END;
    TRACK_OFFSET = 0;
    DO SEG = 0 TO MAX_SEGMENT;
        TRACK_OFFSET = TRACK_OFFSET+CORRECTIONS(SEG);
    END;
    NSEGS = MAX_SEGMENT+1;
    TRACK_OFFSET = ROUND(FLOAT(TRACK_OFFSET)/NSEGS,0);
    DO SEG = 0 TO MAX_SEGMENT;
        CORRECTIONS(SEG) = -(CORRECTIONS(SEG)-TRACK_OFFSET);
    END;
    END GET_CORRECTION;
/*
GETDCOFFSET is used at start-up to calibrate the DC offset of the
servo electronics.  It does this by simply reading the A/D on the
assumption that there is no disk in place at the time.
*/
GETDCOFFSET:
    PROCEDURE EXTERNAL;
```

```
        CALL SELSRV(F_OUTER);
        DC_OFFSET = GETAD();
END GETDCOFFSET;
/*
DSTCVT is the procedure used to translate between a given servo
power, expressed as the ratio between the current reading and
the recorded maximum value, and the distance off-track in pips.
*/
DSTCVT:
    PROCEDURE (RATIO) RETURNS (FIXED);
    DECLARE
        RATIO FLOAT;
    DECLARE
        I FIXED,
        TRTABLE (-2:1) FLOAT STATIC INITIAL (.063,.200,.316,.588);
    DO I = -2 TO 1;
        IF RATIO <= TRTABLE(I) THEN
            RETURN (I);
    END;
    RETURN (2);
    END DSTCVT;
END SRVO_MODULE;
```

What is claimed is:

1. Apparatus for moving a data storage device between a retrievable position at which the data storage device is stored and an operative position at which the data storage device is used, comprising:
   (a) a pick head having a pair of openable and closeable jaws;
   (b) carriage means for carrying said pick head between the retrievable position and the operative position;
   (c) first pick cam means for opening said jaws during movement of said pick head towards the retrievable position and for then closing said jaws about the data storage device at the retrievable position, said pick head being movable with said jaws closed from the retrievable position towards the operative position;
   (d) second release cam means for opening said jaws during movement of said pick head at the operative position and for then closing said jaws beyond the operative position, said pick head being movable with said jaws closed from beyond the operative position towards the retrievable position; and
   (e) means for driving said carriage means between the operative position and the retrievable position.

2. Apparatus according to claim 1 wherein said first pick cam means comprises:
   (a) a pivotal member;
   (b) a cam member connected at a slant to said pivotal member and having an upper cam surface and an underside; and
   (c) a cam follower, connected to said pick head, for opening and closing said jaws, said cam follower riding along said upper cam surface during movement of said pick head towards the retrievable position and contacting said underside to pivot said pivotal member during movement of said pick head from the retrievable position towards the operative position.

3. Apparatus according to claim 1 wherein said second release cam means comprises:
   (a) a pivotal member;
   (b) a cam member connected at a slant to said pivotal member and having an upper cam surface and an underside; and
   (c) a cam follower, connected to said pick head, for opening and closing said jaws, said cam follower riding along said upper cam surface during movement of said pick head towards the operative position and contacting said underside to pivot said pivotal member during movement of said pick head from the operative position towards the retrievable position.

4. Apparatus according to claim 1 wherein said means for driving comprises:
   (a) a drive motor; and
   (b) programmable processor means for controlling said drive motor.

5. Apparatus according to claim 4 wherein said programmable processor means controls said drive motor to drive said pick head into the retrievable position beyond said first pick cam means to pick the data storage device and to drive said pick head no further than said first pick cam means to return the data storage device to the retrievable position.

6. Apparatus according to claim 1 wherein said carriage means further comprises means for controllably securing the data storage device in the operative position.

7. Apparatus according to claim 1 further comprising means for stripping the data storage device from said jaws as said jaws are opened at the operative position.

8. Apparatus, according to claim 1, wherein the data storage device has a slot, and wherein said jaws close through the slot at the retrievable position and during movement of the data storage device from the retrievable position towards the operative position.

9. Apparatus for providing servo information, comprising:
   (a) a data storage medium having a reference track having an outer diameter and an inner diameter, said reference track storing a signal having an amplitude waveform across said reference track for providing a generally level central portion of constant amplitude F and a linearly sloping amplitude portion having a reference position $R_{RP}$ and leading from said generally level central portion of constant amplitude to said inner diameter of said reference track;
   (b) means, movable across said reference track, for detecting said signal to output said generally level central portion of constant amplitude F and said linearly sloping amplitude portion;
   (c) means, coupled to said detecting means, for generating first data representing said constant amplitude F and second data representing the amplitude of said signal at a point on said linearly sloping amplitude portion; and (d) means, coupled to said generating means, for determining the ratio of said second data to said first data and for determining an offset of said detecting means from said reference position $R_{RP}$ in response to said ratio.

10. Apparatus, according to claim 9, wherein said reference position $R_{RP}$ is at a predetermined ratio of an amplitude of said linearly sloping amplitude portion to said constant amplitude F.

11. Apparatus, according to claim 10, wherein said predetermined ratio is 0.5F.

12. Apparatus, according to claim 9, wherein said means for detecting comprises:
    (a) a signal detector;
    (b) stepper motor means for moving said signal detector across said reference track; and
    (c) means for controlling said stepper motor means to move said signal detector in full steps to output said generally level central portion of constant amplitude F and in microsteps to output said linearly sloping amplitude portion.

13. Apparatus, according to claim 9, wherein said signal is a single frequency signal.

14. A disk drive for accessing data, comprising:
    (a) a disk-type data storage medium having a plurality of concentric data tracks having centerlines and a single concentric servo track having an outer diameter and an inner diameter, said servo track storing a frequency signal having an amplitude waveform across said servo track for providing a generally level central portion of constant amplitude F and a linearly sloping amplitude portion having a reference position $R_{RP}$ leading from said generally level central portion of constant amplitude F to said inner diameter of said servo track;
    (b) first means, movable across said servo track and said data tracks, for detecting said frequency signal to output said generally level central portion of constant amplitude F and said linearly sloping amplitude portion, said first detecting means including a scale having scale lines representing the distance between said centerlines of said data tracks and the distance between said servo track and one of said data tracks adjacent said servo track, said reference position $R_{RP}$ being a certain distance from said one adjacent data track;
    (c) second means for detecting said scale lines in response to movement of said first detecting means across said servo track and said data tracks and for storing counts corresponding to the positions of said servo track and said data tracks;
    (d) means, coupled to said first and second detecting means, for determining a ratio of the amplitude of said frequency signal at a point on said linearly sloping amplitude portion to said constant amplitude portion F and for determining an offset of said first detecting means from said reference position $R_{RP}$ in response to said ratio and for determining a number representing the distance from said offset to said adjacent one data track; and
    (e) means for moving said first detecting means to any one of said data tracks in dependence on said number and said counts.

15. A disk drive according to claim 14, wherein said disk-type data storage medium is expandable and contractable and said scale is expandable and contractable in proportion to said disk-type data storage medium.

16. Apparatus for storing and retrieving a data storage device, comprising:
    (a) means for providing an operative position for the data storage device;
    (b) means for storing the data storage device at a retreivable position;
    (c) pivotal means for clamping the data storage device at the operative position; and
    (d) means for moving the data storage device from the retrievable position to the operative position, including
       (i) means for pivoting said pivotal means to clamp the data storage device;
       (ii) a movable carriage carrying said pivoting means;
       (iii) a motor for moving said movable carriage; and
       (iv) programmable microprocessor means for controlling said motor to move said movable carriage to clamp and reclamp the data storage device in response to misclamping of the data storage device at the operative position.

17. Apparatus according to claim 16, wherein said pivotal means has a pivotal clamp arm and a cam being pivotal with said clamp arm, and said pivoting means comprises a cam follower being movable along said cam.

18. Apparatus for storing and retrieving a plurality of data storage devices, comprising:
    (a) means for providing an operative position for one of the data storage devices;
    (b) means for storing the plurality of data storage devices and being pivotal in relation to said providing means;
    (c) means for selectively pivoting said storing means to move a selected one of the data storage devices into a retrievable position, including controllable means for driving said storing means, and programmable processor means for controlling said controllable driving means; and
    (d) means for moving the selected one of the data storage devices between the retrievable position and the operative position.

19. Apparatus according to claim 18 wherein said controllable driving means comprises:
    (a) an index cam coupled to said storing means;
    (b) a cam follower coupled to said index cam; and
    (c) stepper motor means for moving said cam follower along said index cam.

20. Apparatus for storing and retrieving a plurality of data storage devices, comprising:
    (a) means for providing an operative position for one of the data storage devices;
    (b) means for storing the plurality of data storage devices and being pivotal in relation to said providing means;
    (c) means for selectively pivoting said storing means to move a selected one of the data storage devices into a retrievable position; and
    (d) means for moving the selected one of the data storage devices between the retrievable position and the operative position, including picker means for releasably clamping the selected one of the data storage devices in the retrievable position and for releasably unclamping the selected one of the data storage devices in the operative position.

21. Apparatus according to claim 20 wherein said picker means for releasably clamping and unclamping comprises:
   (a) a pick head having a pair of openable and closeable jaws for picking the selected one of the data storage devices, and having a cam follower;
   (b) carriage means for carrying said pick head between the retrievable position and the operative position;
   (c) a first pick cam having a pick cam surface for opening and closing said jaws, said cam follower following said pick cam surface near the retrievable position to open said jaws about the selected one of the data storage devices and then to close said jaws and pick the selected one of the data storage devices in the retrievable position, said cam follower bypassing said pick cam surface after picking the selected one of the data storage devices and while moving towards the operative position;
   (d) a second release cam having a release cam surface for opening and closing said jaws, said cam follower following said release cam surface near the operative position to open said jaws and release the selected one of the data storage devices in the operative position and then to close said jaws, said cam follower bypassing said release cam surface to push the selected one of the data storage devices with said jaws closed from the operative position towards the retrievable position; and
   (e) means for driving said carriage means.

22. Apparatus according to claim 21 wherein said picker means for releasably clamping and unclamping further comprises a stripping device for stripping the selected one of the data storage devices from said jaws in the operative position as said jaws are opened.

23. Apparatus according to claim 21 wherein said carriage means comprises means for releasably securing the selected one of the data storage devices in the operative position.

24. Apparatus according to claim 20 wherein said means for storing comprises a pack having a groove and a detent biased into said groove to hold the plurality of data storage devices in said pack and to force the selected one of the data storage devices into the retrievable position in response to said picker means for releasably clamping and unclamping being near the retrievable position.

25. Apparatus according to claim 20 wherein said means for storing comprises a pack having a cut-out, said picker means for releasably clamping and unclamping being movable into said cut-out to pick and retrieve the selected one of the data storage devices.

* * * * *